(12) United States Patent
Frederick

(10) Patent No.: US 7,029,145 B2
(45) Date of Patent: Apr. 18, 2006

(54) LOW VOLTAGE DECORATIVE LIGHT STRING INCLUDING POWER SUPPLY

(75) Inventor: W. Richard Frederick, Mundelein, IL (US)

(73) Assignee: Integrated Power Components, Inc., Hardy, VA (US)

( * ) Notice: Subject to any disclaimer, the term of this patent is extended or adjusted under 35 U.S.C. 154(b) by 146 days.

(21) Appl. No.: 10/355,911

(22) Filed: Jan. 31, 2003

(65) Prior Publication Data

US 2003/0198048 A1 Oct. 23, 2003

Related U.S. Application Data

(63) Continuation-in-part of application No. PCT/US02/07609, filed on Mar. 13, 2002.

(60) Provisional application No. 60/287,162, filed on Apr. 27, 2001, provisional application No. 60/277,346, filed on Mar. 19, 2001.

(51) Int. Cl.
*F21V 23/02* (2006.01)

(52) U.S. Cl. ............... 362/234; 362/227; 362/253; 315/192; 315/185 S

(58) Field of Classification Search ............... 362/20, 362/227, 249, 251, 252, 254, 806–811, 802, 362/234, 253; 315/88, 90, 119, 121, 125, 315/126, 185 R, 192, 185 S, 184
See application file for complete search history.

(56) References Cited

U.S. PATENT DOCUMENTS

| | | | | |
|---|---|---|---|---|
| 1,974,472 A | * | 9/1934 | Seghers | 315/185 S |
| 2,188,529 A | * | 1/1940 | Corina | 362/123 |
| 2,272,523 A | * | 2/1942 | Inman | 315/185 S |
| 2,760,120 A | * | 8/1956 | Fisherman | 315/185 S |
| 3,214,579 A | | 10/1965 | Pacini | 362/227 |
| 3,723,723 A | * | 3/1973 | Lerner | 362/251 |
| 3,755,663 A | * | 8/1973 | George, Jr. | 362/249 |
| 3,789,211 A | * | 1/1974 | Kramer | 362/231 |
| 3,964,040 A | | 6/1976 | Behl | 315/89 |

(Continued)

FOREIGN PATENT DOCUMENTS

EP 1 061 308 A2 12/2000

(Continued)

OTHER PUBLICATIONS

International Rectifier Product Literature for IR21571(S)—Fully Integrated Ballast Control IC, Data Sheet PD No. 60179-G, dated 2002, 17 pages.

(Continued)

*Primary Examiner*—Thomas M. Sember
*Assistant Examiner*—Ismael Negron
(74) *Attorney, Agent, or Firm*—Jenkens & Gilchrist

(57) ABSTRACT

One or more strings of decorative lights are supplied with power by converting a standard residential electrical voltage to a low-voltage, and supplying the low-voltage to at least one pair of parallel conductors having multiple decorative lights connected to the conductors along the lengths thereof, each of the lights, or groups of the lights, being connected in parallel across the conductors. A string of decorative lights comprises a power supply having an input adapted for connection to a standard residential electrical power outlet, the power supply including circuitry for converting the standard residential voltage to a low-voltage output; a pair of conductors connected to the output of the power supply for supplying the low-voltage output to multiple decorative lights; and multiple lights connected to the conductors along the lengths thereof, each of the lights, or groups of the lights, being connected in parallel across the conductors.

48 Claims, 15 Drawing Sheets

U.S. PATENT DOCUMENTS

| | | | |
|---|---|---|---|
| 4,034,259 A | 7/1977 | Schoch | 315/93 |
| 4,072,857 A * | 2/1978 | DeVicaris | 362/123 |
| 4,227,228 A | 10/1980 | Cheng | 361/104 |
| 4,241,387 A | 12/1980 | Bowers | 362/252 |
| 4,253,233 A | 3/1981 | Lovrekovic et al. | 29/857 |
| 4,340,841 A | 7/1982 | Schupp | 315/75 |
| 4,350,407 A | 9/1982 | Tong | 339/113 L |
| 4,425,605 A | 1/1984 | Cheng | 362/252 |
| 4,607,317 A * | 8/1986 | Lin | 362/249 |
| 4,631,650 A * | 12/1986 | Ahroni | 362/249 |
| 4,712,586 A * | 12/1987 | McCauley et al. | 138/89 |
| 4,727,449 A * | 2/1988 | Fleck | 315/122 |
| 4,799,177 A | 1/1989 | Sarr | 364/563 |
| 4,808,885 A | 2/1989 | Bauch et al. | 315/122 |
| 4,855,880 A * | 8/1989 | Mancusi Jr. | 362/123 |
| 4,862,041 A | 8/1989 | Hirschmann | 315/246 |
| 4,870,547 A | 9/1989 | Crucefix | 362/123 |
| 4,904,904 A | 2/1990 | Zarate | 315/219 |
| 4,943,752 A | 7/1990 | Todd et al. | 310/339 |
| 4,984,999 A * | 1/1991 | Leake | 439/425 |
| 5,032,961 A | 7/1991 | Pouyanne et al. | 362/251 |
| 5,070,522 A | 12/1991 | Nilssen | 379/90 |
| 5,150,964 A | 9/1992 | Tsui | 362/251 |
| 5,180,952 A | 1/1993 | Nilssen | 315/210 |
| 5,290,986 A | 3/1994 | Colon et al. | 219/770 |
| 5,317,491 A | 5/1994 | Lee | 362/85 |
| 5,365,145 A | 11/1994 | Fields | 315/85 |
| 5,365,162 A * | 11/1994 | Sundhar | 323/320 |
| 5,387,845 A | 2/1995 | Nilssen | 315/209 |
| 5,458,241 A | 10/1995 | Brown | 206/419 |
| 5,495,147 A | 2/1996 | Lanzisera | 315/185 |
| 5,676,250 A | 10/1997 | Walters | 206/419 |
| 5,729,445 A | 3/1998 | Huelsmann | 363/34 |
| 5,941,626 A * | 8/1999 | Yamuro | 362/246 |
| D414,291 S | 9/1999 | Gary et al. | D26/138 |
| 5,975,717 A | 11/1999 | Rahman | 362/251 |
| 6,072,280 A * | 6/2000 | Allen | 315/185 S |
| 6,074,244 A | 6/2000 | Crum et al. | 439/505 |
| 6,097,158 A | 8/2000 | Manor et al. | 315/127 |
| 6,102,551 A | 8/2000 | Hsu | 362/226 |
| 6,157,551 A | 12/2000 | Barak et al. | 363/37 |
| 6,177,786 B1 | 1/2001 | Shimamori | 323/283 |
| 6,294,934 B1 | 9/2001 | Garrett, Jr. et al. | 327/108 |
| 6,319,056 B1 * | 11/2001 | Schunk et al. | 439/505 |
| 6,344,716 B1 * | 2/2002 | Gibboney, Jr. | 315/185 S |
| 6,457,842 B1 * | 10/2002 | Ingrassia | 362/251 |
| 6,474,841 B1 * | 11/2002 | Rahman | 362/252 |
| 6,559,605 B1 * | 5/2003 | Wu et al. | 315/185 S |

FOREIGN PATENT DOCUMENTS

JP          6-304059        6/1994

OTHER PUBLICATIONS

Microchip Technology, Inc. PIC12C67X Data Sheet, 8-Pin, 8-Bit CMOS Microcontrollers with A/D Convert and EEPROM Data Memory, Copyright 1999, 129 pages.

* cited by examiner

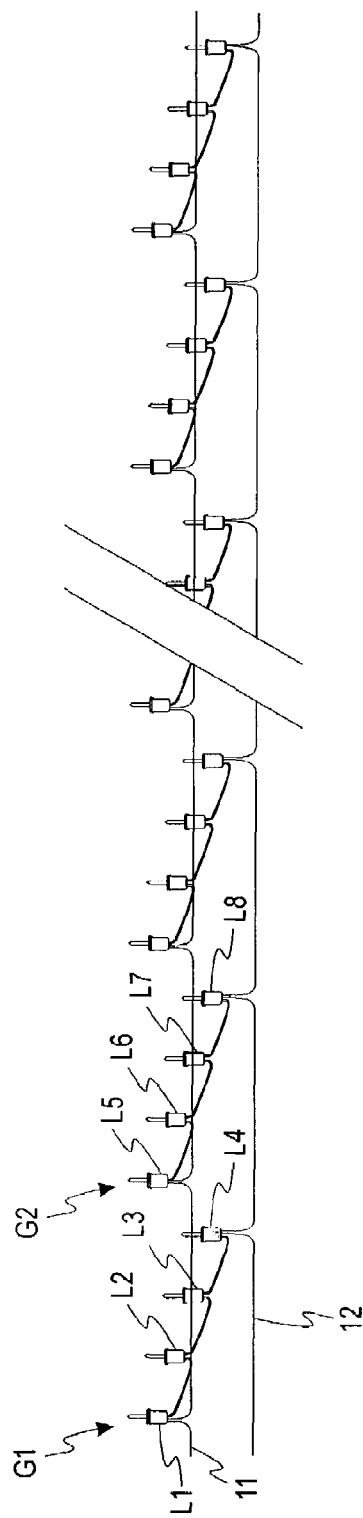
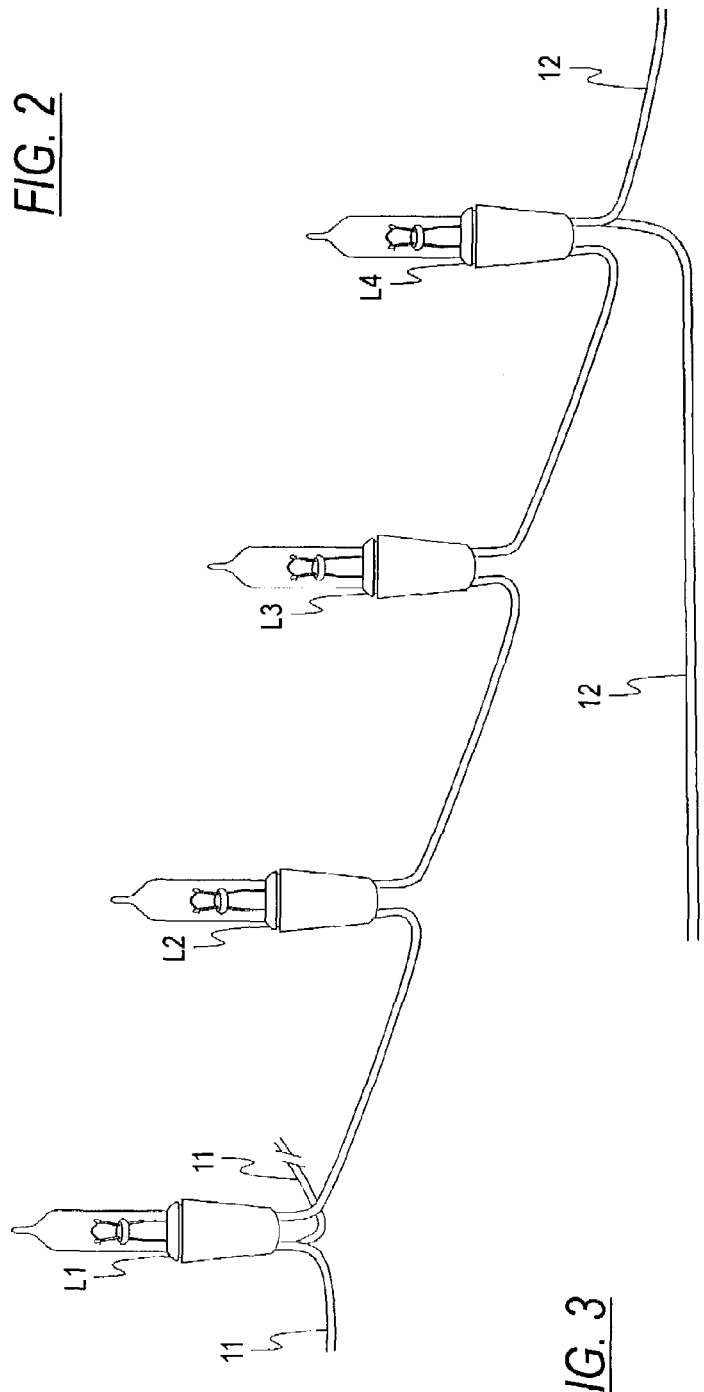

US 7,029,145 B2

LOW VOLTAGE DECORATIVE LIGHT STRING INCLUDING POWER SUPPLY

CROSS-REFERENCES TO RELATED APPLICATIONS

This application is a U.S. continuation-in-part of International PCT Application PCT/02/07609, filed Mar. 13, 2002, which claims priority from provisional Application Ser. No. 60/287,162, filed on Apr. 27, 2001, now abandoned, and from U.S. Provisional Application Ser. No. 60/277,346 filed on Mar. 19, 2001, now abandoned.

FIELD OF THE INVENTION

The present invention relates to decorative lights, including lights for Christmas trees, including pre-strung or "pre-lit" artificial trees.

SUMMARY OF THE INVENTION

In accordance with the present invention, one or more strings of decorative lights are supplied with power by converting a standard residential electrical voltage to a low-voltage, and supplying the low-voltage to at least one pair of parallel conductors having multiple decorative lights connected to the conductors along the lengths thereof, each of the lights, or groups of the lights, being connected in parallel across the conductors. A string of decorative lights embodying this invention comprises a power supply having an input adapted for connection to a standard residential electrical power outlet, the power supply including circuitry for converting the standard residential voltage to a low-voltage output; a pair of conductors connected to the output of the power supply for supplying the low-voltage output to multiple decorative lights; and multiple lights connected to the conductors along the lengths thereof, each of the lights, or groups of the lights, being connected in parallel across the conductors. The lights preferably require voltages of about 6 volts or less, and are preferably connected in parallel groups of 2 to 5 lights per group with the lights within each group being connected in series with each other.

The parallel groups are useful for current management. Light strings typically have 100 bulbs, and 100 6-volt bulbs drawing 80 ma./bulb in parallel requires a total current flow of 8 amps, which requires relatively thick wires. With the parallel groups, the total current and the wire size can both be reduced.

In one particular embodiment, a low-voltage DC power supply is used in combination with a string having dual-bulb sockets and associated diode pairs to permit different decorative lighting effects to be achieved by simply reversing the direction of current flow in the string, by changing the orientation of the string plug relative to the power supply.

Another aspect of the invention is to provide spare-part storage as an integral part of the light string, so that failed bulbs and fuses can be easily and quickly replaced with a minimum of effort. Improved bulb removal devices are also provided to further facilitate bulb replacement.

BRIEF DESCRIPTION OF THE DRAWINGS

The invention may best be understood by reference to the following description taken in conjunction with the accompanying drawings, in which:

FIG. 2 is a more detailed diagram of the light string shown in FIG. 1;

FIG. 3 is an enlarged and more detailed perspective view of a portion of the light string of FIG. 1;

DETAILED DESCRIPTION OF THE ILLUSTRATED EMBODIMENTS

Although the invention will be described next in connection with certain preferred embodiments, it will be understood that the invention is not limited to those particular embodiments. On the contrary, the description of the invention is intended to cover all alternatives, modifications, and equivalent arrangements as may be included within the spirit and scope of the invention as defined by the appended claims.

Figure 1:
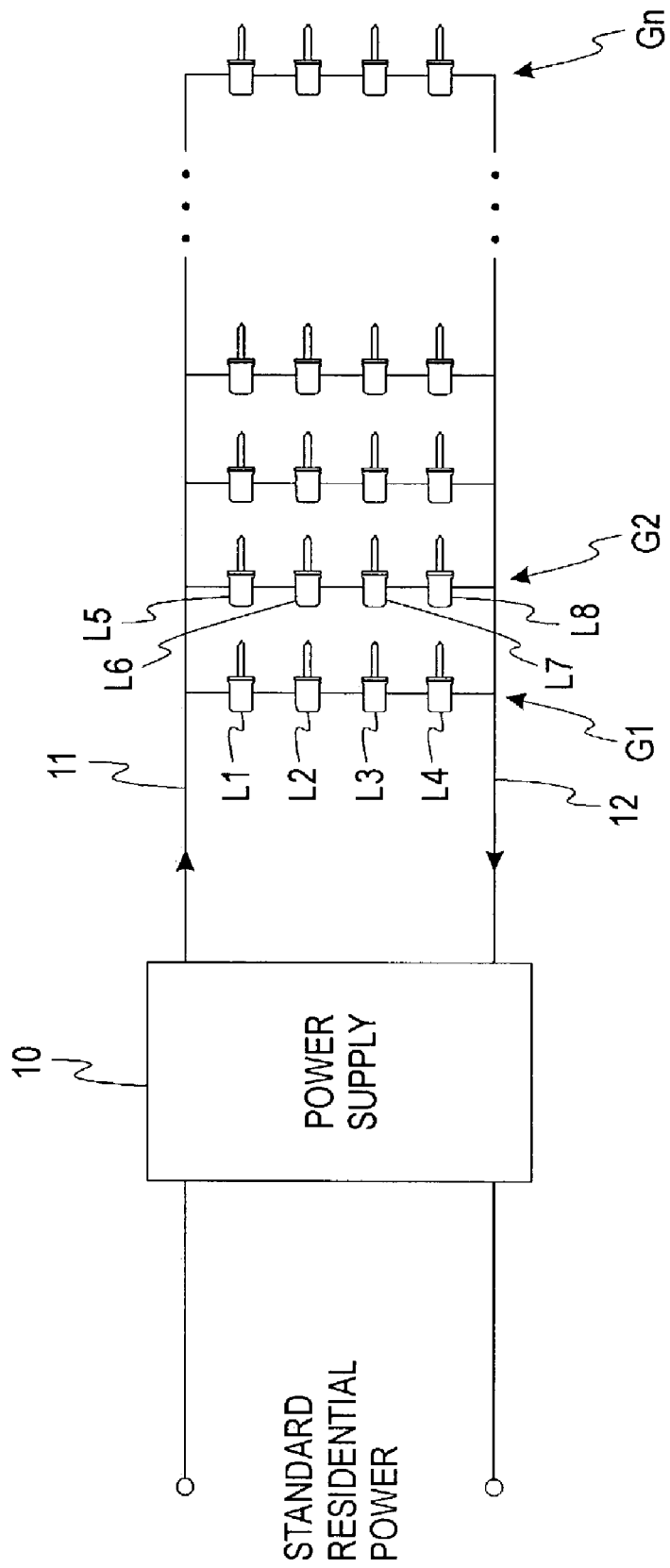
FIG. 1 is a schematic diagram of a string of decorative lights embodying the present invention.

Turning now to the drawings and referring first to FIGS. 1–3, a power supply 10 is connected to a standard residential power outlet that supplies electrical power at a known voltage and frequency. In the United States, the known voltage is 120 volts and the frequency is 60 Hz, whereas in Europe and some other countries the voltage is 250 volts and the frequency is 50 Hz. The power supply 10 converts the standard power signal to a 24-volt, 30-KHz output, which is supplied to a pair of parallel conductors 11 and 12 that supply power to multiple 6-volt incandescent lights L. A typical light "string" contains 100 lights L.

Multiple groups of the lights L are connected across the two conductors 11 and 12, with the lights within each group being connected in series with each other, and with the light groups in parallel with each other. For example, lights L1–L4 are connected in series to form a first light group G1 connected across the parallel conductors 11 and 12, lights L5–L8 are connected in series to form a second group G2 connected across the conductors 11 and 12 in parallel with the first group G1, and so on to the last light group Gn.

If one of the bulbs fails, the group of four series-connected lights containing that bulb will be extinguished, but all the other 96 lights in the other groups will remain illuminated because their power-supply circuit is not interrupted by the failed bulb. Thus, the failed bulb can be easily and quickly located and replaced. Moreover, there is no need for shunts to bypass failed bulbs, which is a cost saving in the manufacture of the bulbs. If it is desired to avoid extinguishing all the lights in a series-connected group when one of those lights fails, then the lights may still be provided with shunts that are responsive to the low-voltage output of the power supply. That is, each shunt is inoperative unless and until it is subjected to substantially the full output voltage of the power supply, but when the filament associated with a shunt fails, that shunt is subjected to the full output voltage, which renders that shunt operative to bypass the failed filament. A variety of different shunt structures and materials are well known in the industry, such as those described in U.S. Pat. Nos. 4,340,841 and 4,808,885.

Each of the individual lights L uses a conventional incandescent bulb 20 attached to a plastic bulb base 21 adapted to be inserted into a plastic socket 22 attached to the wires that supply power to the bulb. Each bulb contains a filament 23 that is held in place by a pair of filament leads 25 and 26 extending downwardly through a glass bead 24 and a central aperture in the base 21. The lower ends of the leads 25, 26 are bent in opposite directions around the lower end of the base 21 and folded against opposite sides of the base to engage contacts 27 and 28 in the socket 22. The interior of the socket 22 has a shape complementary to the exterior shape of the lower portion of the bulb base 21 so that the two components fit snugly together.

Figure 4:
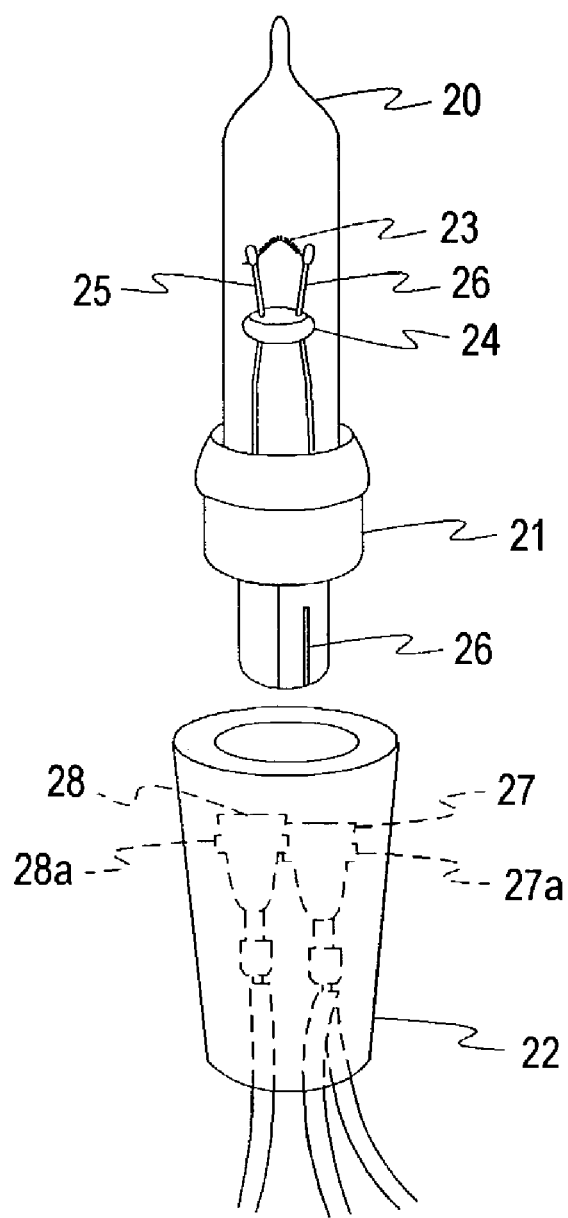
FIG. 4 is an exploded perspective view of a bulb and socket for use in the light string of FIGS. 1–3.

As shown most clearly in FIG. 4, the contacts 27 and 28 in each socket 22 are formed by tabs attached to stripped end portions of the multiple wire segments that connect the lights L in the desired configuration. These wire segments include multiple segments of the conductors 11 and 12. As can be seen in FIG. 4, the contacts 27, 28 in each socket 22 are fed up through a hole in the socket and seated in slots formed in the interior surface of the socket on opposite sides of the hole. Prongs 27a and 28a on the sides of the tabs engage the plastic walls of the slots to hold the contacts securely in place within the slots. When the bulb base 21 is inserted into its socket 22, the bent filament leads 25, 26 on opposite sides of the bulb base 21 are pressed into firm contact with the contacts 27, 28.

As can be most clearly seen at the lower right-hand corner of FIG. 4, the contact 27 at each end of each series-connected group G is connected to two wires, one of which is a segment of one of the conductors 11 and 12, and the other of which leads to the next light in that particular series-connected group G.

After all the connections have been made, the wires are twisted or wrapped together as in conventional light sets in which all the lights are connected in series.

Turning next to the power supply 10, an electronic transformer is preferred to minimize cost and complexity. Power supplies of this type generally use switching technology to make the transformer more efficient. An alternative is a power supply that uses switching technology and pulse width modulation ("PWM") or frequency modulation for output regulation, although this type of power supply is generally more expensive than those using electronic transformers. One suitable electronic transformer is available from ELCO Lighting of Los Angeles, Calif., Cat. No. ETR150, which converts a 12-volt, 60-Hz input into a 12-volt, 30-KHz output.

Figure 5A:
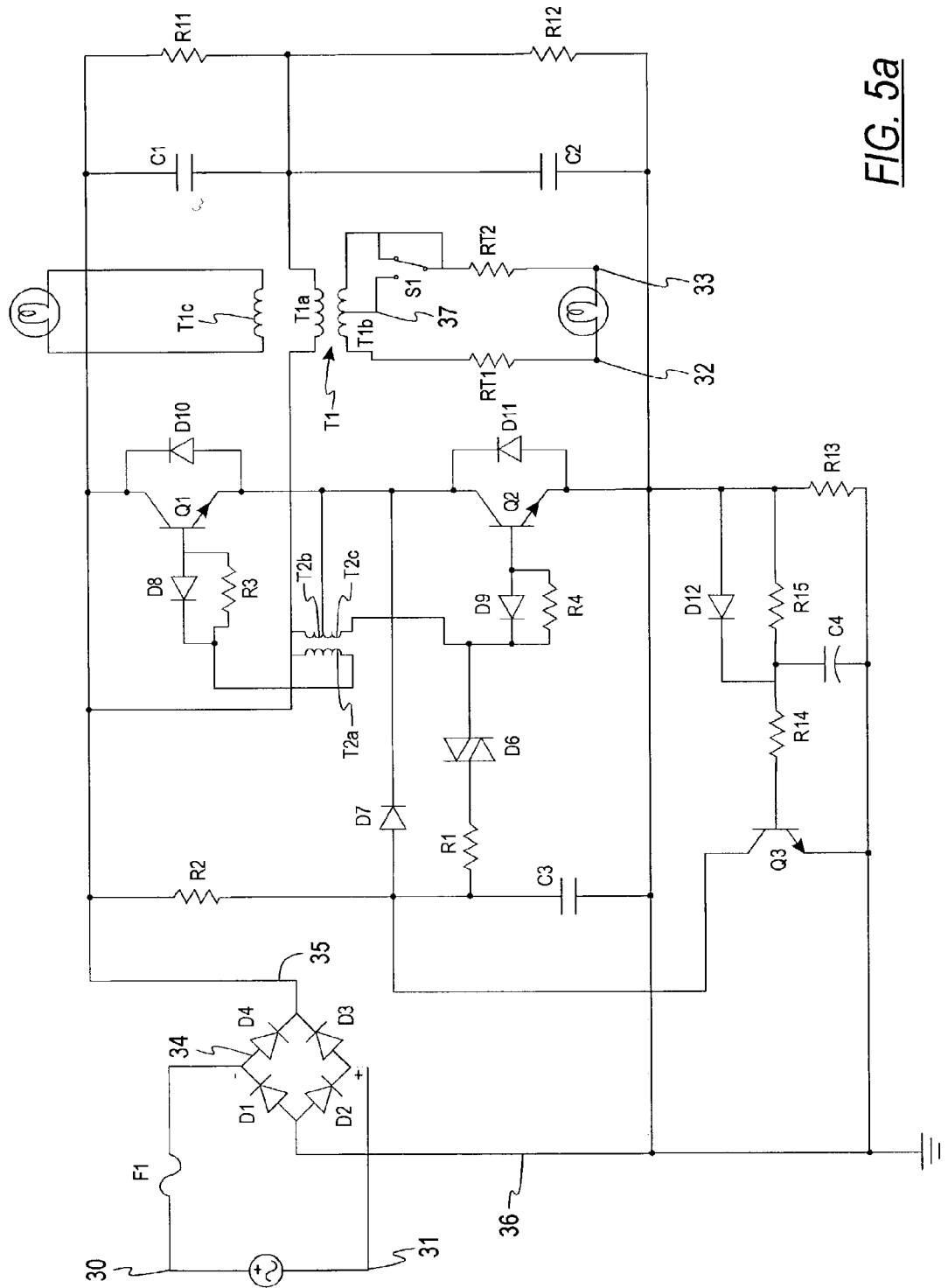
FIG. 5*a* is a schematic circuit diagram of a suitable power supply for use with the light string of FIGS. 1–3.

FIG. 5a is a generalized schematic diagram of an electronic transformer for converting a standard 120-volt, 60-Hz input at terminals 30 and 31 into a 24-volt DC output at terminals 32 and 33. It will be understood that electronic transformers for supplying low-voltage, high-frequency signals are well known and vary to some degree depending on the output wattage range of the supply, and the particular design of the electronic transformer is not part of the present invention. FIG. 5a illustrates a standard self-oscillating half-bridge circuit in which two transistors Q1 and Q2 and parallel diodes D10 and D11 form the active side of the bridge, and two capacitors C1 and C2 and parallel resistors R11 and R12 form the passive side.

The AC input from terminals 30 and 31 is supplied through a fuse F1 to a diode bridge 34 consisting of diodes D1–D4 to produce a full-wave rectified output across busses 35 and 36 leading to the transistors Q1, Q2 and the capacitors C1, C2. The capacitors C1, C2 form a voltage divider, and one end of the primary winding T1a of an output transformer T1 is connected to a point between the two capacitors C1, C2. The secondary winding T1b of the output transformer is connected to the output terminals 32, 33, which are typically part of a socket for receiving one or more plugs on the ends of light strings. The resistors R11 and R12 are connected in parallel with the capacitors C1 and C2 to equalize the voltages across the two capacitors, and also to provide a current bleed-off path for the capacitors in the event of a malfunction or a blown fuse.

When power is supplied to the circuit, a capacitor C3 begins charging to the input voltage through a resistor R2. A diac D6 and a current-limiting resistor R1 are connected in series from a point between the capacitor C3 and the resistor R2 to the base of the transistor Q2. When the capacitor C3 charges to the trigger voltage of the diac D6 the capacitor C3 discharges, supplying current to the base of the transistor Q2 and turning on that transistor. A diode D7 avoids any circuit imbalance between the drive of Q1 and Q2 when the converter is in the steady-state mode, by preventing the capacitor from charging and the diac from triggering. A resistor R2 limits the current from the bus 35. Resistors R3 and R4 connected to the bases of the respective transistors Q1 and Q2 stabilize the biases, and diodes D8 and D9 in parallel with the respective resistors R3 and R4 provide for fast turn off.

Self-oscillation of the illustrative circuit is provided by an oscillator transformer T2 having a saturable core. A ferrite core having a B/H curve as square as possible is preferred to provide a reliable saturation point. The number of turns in the primary and secondary windings T2b and T2a of the transformer T2 are selected to force the operating gain of the transistors Q1 and Q2, based on the following equation:

$$N_p * I_p = N_s * I_s$$

where $N_p$ is the number of turns in the primary winding, T2b $N_s$ is the number of turns in the secondary winding, T2a, $I_p$ is the peak collector current, and $I_s$ is the base current. Suitable values for $N_p$ and $N_s$ are 1 and 3, respectively, and assuming a one-volt supply across the primary winding $N_p$, the forced gain is 3. The nominal collector current $I_c$ is:

$$I_c = (P_{out}/\eta)*(2/V_{line})$$

where $P_{out}$ and $V_{line}$ are RMS values, and $\eta$ is the efficiency of the output transformer T1.

The oscillator ransformer T2 determines the oscillation frequency F according to the following equation:

$$F = (V_p * 10^4)/(4 * B_s * A * N_p)$$

where F is the chopper frequency, $V_p$ is the voltage across the primary winding T2b of the oscillator transformer T2 in volts, $B_s$ is the core saturation flux in Tesla, and A is the core cross section in cm$^2$.

The output transformer T1 has a non-saturable core with a ratio $N_p/N_s$ to meet the output requirements, such as 24 volts (RMS). It must also meet the power requirements so that it may operate efficiently and safely. The voltage across the primary winding T1a is the peak-to-peak rectified voltage $V_{p-p}$:

$$V_{p-p} = 120*2*1.414 = 170 V_{p-p}$$

The desired 24-volt output translates to:

$$V_{p-p} = 24*2*1.414 = 67.8 V_{p-p}$$

Thus, the required ratio of turns in the primary and secondary windings of the transformer T1 is 170/67.8 or 2.5/1.

A third winding T1c with a turns ratio of 10/1 with respect to the primary winding provides a nominal 6-volt output for a bulb checker, described below.

The illustrative circuit also includes a light dimming feature. Thus, a switch S1 permits the output from the secondary winding T1b to be taken across all the turns of that winding or across only half the turns, from a center tap 37. A pair of thermistors RT1 and RT2 are provided in the two leads from the secondary winding T1b to the terminals 32 and 33 to limit inrush current during startup.

To automatically shut down the circuit in the event of a short circuit across the output terminals 32 and 33, a transistor Q3 is connected to ground from a point between the resistor R1 and the capacitor C3. The transistor Q3 is normally off, but is turned on in response to a current level through resistor R13 that indicates a short circuit. The resistor R13 is connected in series with the emitter-collector circuits of the two transistors Q1 and Q2, and is connected to the base of the transistor Q3 via resistors R14 and R15, a diode D12, and capacitor C4. The current in the emitter-collector circuit of transistors Q1 and Q2 rises rapidly in the event of a short circuit across the output terminals 32, 33. When this current flow through resistor R13 rises to a level that causes the diode D12 to conduct, the transistor Q3 is turned on, thereby disabling the entire power supply circuit.

Figure 5B:
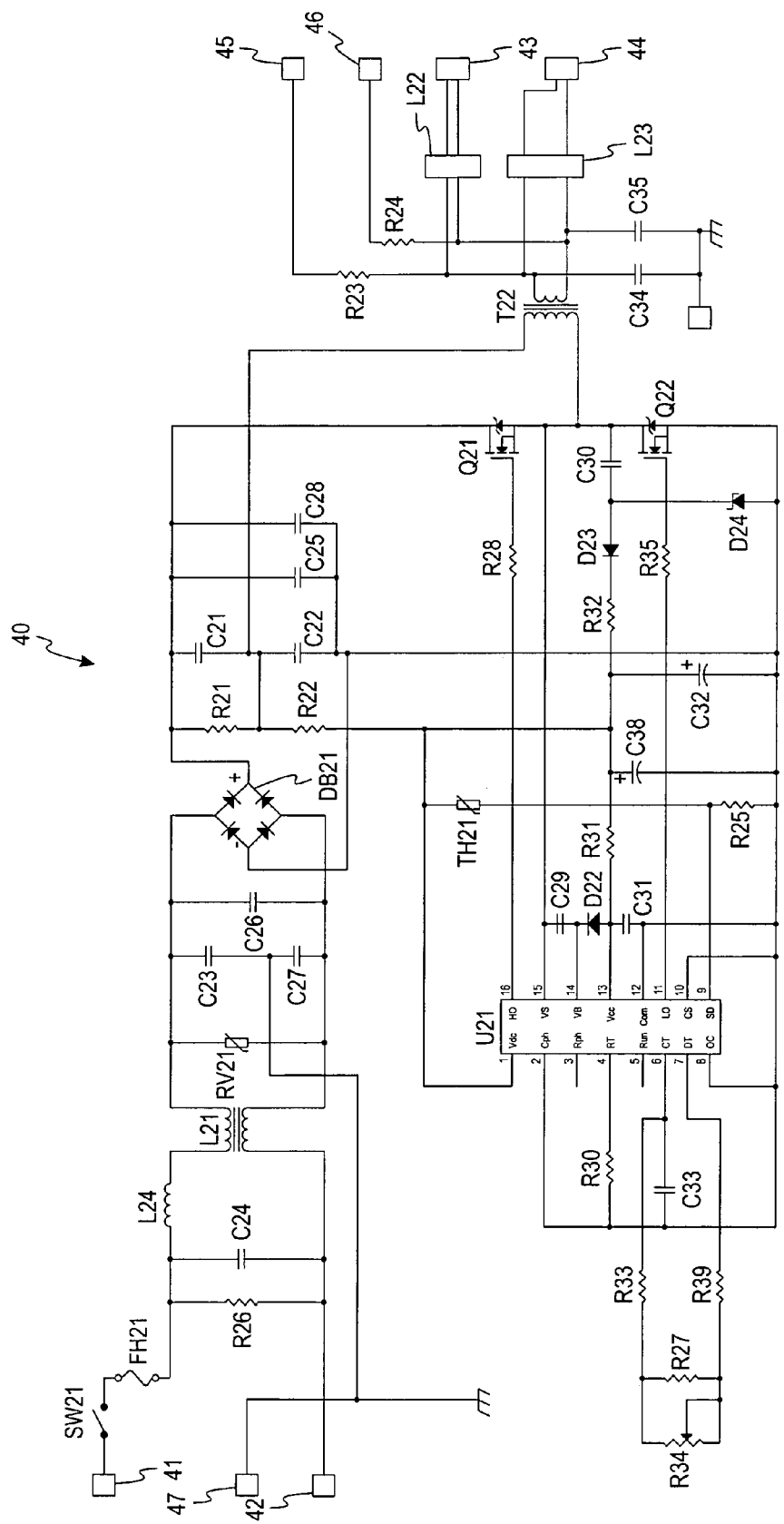
FIG. 5*b* is a schematic circuit diagram of another suitable power supply for use with the light string of FIGS. 1–3.

FIG. 5b is a generalized schematic diagram of another power supply 40 that dissipates very little heat. The power supply of FIG. 5b converts standard 120-volt AC, 60-Hz input at terminals 41, 42 into a 24-volt DC, 30 KHz PWM output at terminals 43, 44, 45 and 46. The AC input from the terminals 41, 42 is supplied through a switch SW21, a fuse FH21, and a circuit formed by resistor R26, a safety discharge capacitor C24 and an inductor L24, which suppresses conducted emissions, to a common mode filter inductor L21. Common ground is connected to terminal 47. A varistor RV21 provides surge protection, and capacitors C23, C26 and C27, across the output of the common mode filter L21, prevent RFI emissions from the circuitry.

A full-wave bridge rectifier DB21, which is operated at high temperatures by limited heat sinking to reduce voltage drops and to improve efficiency, produces a full-wave rectified output into a capacitive filter formed by film capacitors C25 and C28. Bleeder resistors R21, R22 form a voltage divider that charges up a pair of capacitors C32 and C38 in the switching power control circuit. When this voltage exceeds 11.5 volts, the circuit starts up.

The PWM output voltage is achieved by switching a pair of MOSFET transistors Q21 and Q22 on and off by the integrated circuit driver U21, such as an IR21571 driver available from International Rectifier. MOSFET transistors Q21 and Q22, such as an IRFB260N available from International Rectifier have very low "on" resistance which improves the efficiency of energy transfer. The driver U21 is powered by a charge pump created by a capacitor C30, a pair of diodes D23 and D24, and a current limiter R31. A safety thermal shutdown circuit is formed by a thermistor TH21 and a resistor R25 which act as a voltage divider to the shut down pin of the driver U21. If the thermistor's resistance decreases due to a temperature increase beyond the design specification, the voltage presented to the driver U21 increases above 2.0 volts, which causes the driver U21 to shut down and protects the circuit and the power MOSFETs Q21 and Q22.

The controlled switching of the power MOSFET transistors Q21 and Q22, through respective current limiting resistors R28 and R35, is performed by an oscillator internal to the driver U21, in conjunction with external circuitry. The pulse width on time is determined by capacitor C33 and a resistor R30, and the interval between pulses is controlled by resistors R33, R39, R27 and variable resistor R34. The values chosen for the implementation yield a pulse width with up to 50% off time to produce light dimming.

A limited dimming control is achieved by varying the frequency of the oscillation of the integrated circuit U21 by the potentiometer R34. Alternatively, a fixed light control can be provided to produce only three conditions:
1. Low light output.
2. Energy saving.
3. Full light output.

These three output light levels can be achieved by use of three fixed resistors in combination with a three-position switch in place of the potentiometer R34. Low light output corresponds to a minimum output voltage. Full light output corresponds to a maximum output voltage. Energy saving output corresponds to an intermediate light level such as 75% light output from the bulbs.

The bulb life can be extended by soft-starting the integrated circuit driver U21, so that U21 starts with minimum light output and ramps up to the full or desired light level. At the time of start, the bulbs are cold, and the cold resistance of the bulbs is very low. The cold resistance of the bulb is four to six times lower than steady-state, full-light operating resistance. When the full voltage is applied to the bulb at start-up, the starting bulb current is therefore four to six times the rated current of the bulb. This higher current at the time of start-up can cause bulb filaments to weaken and ultimately break. By soft-starting the control circuit, one applies six to eight times lower voltage during starting of the bulb. As the bulb heats up and bulb resistance increases, the voltage is increased. By starting a bulb in this fashion the bulb current never exceeds its hot rating. This increases bulb life. Soft-starting of the circuit also helps reduce the inrush current from the circuit, thereby avoiding any interaction with other circuits or appliances.

If a wider range of dimming control is needed, the driver U21 can be replaced by another integrated circuit such as an IC2106 along with a PWM controller to drive a fuller range of PWM output voltage. Because the lamp load is a resistive load, the output can be controlled from almost zero light to full light.

The switching function of the power MOSFETS Q21 and Q22 supplies current for the bootstrap power of the driver U21 through a charge pump circuit, using capacitors C29, C31 and a fast recovery diode D22 such as an MUR140. During half-bridge switching, when MOSFET Q22 is on and the MOSFET Q21 is off, the capacitor C29 is charged from the decoupling capacitor C31 and through MOSFET Q22. Alternately, when the MOSFET Q22 is off and MOSFET Q21 is on, the diode D22 is reverse biased, and the capacitor C29 supplies power to the gate driver circuitry of MOSFET Q21.

The switching power supply drives a power transformer T22 that has a primary rating of ½ line voltage (e.g., 60 volts) and a 24-volt secondary. In this embodiment, the power transformer T22 is a toroid design, which improves power efficiency due to low leakage inductance. The primary tap 1 of the toroid transformer T22 is fed by the switching power circuit, while primary tap 2 is connected to the rectified DC power. The secondary winding of the toroid transformer T22 is filtered to common ground by a pair of film capacitors C34 and C35. The output of the secondary is then fed through a pair of inductive filters L22 and L23, to comply with FCC EMI emission regulations, to terminals 43 and 44. The output of the secondary of the transformer T22 is also fed to terminals 45 and 46 through current limiting resistors R23 and R24, respectively.

Although the circuit of FIG. 5b uses a half bridge circuit, this circuit can be extended to any other topology such as Flyback, Forward, Cuk, Full Bridge resonant or any other power converter for driving lamp load applications.

Figure 5C:
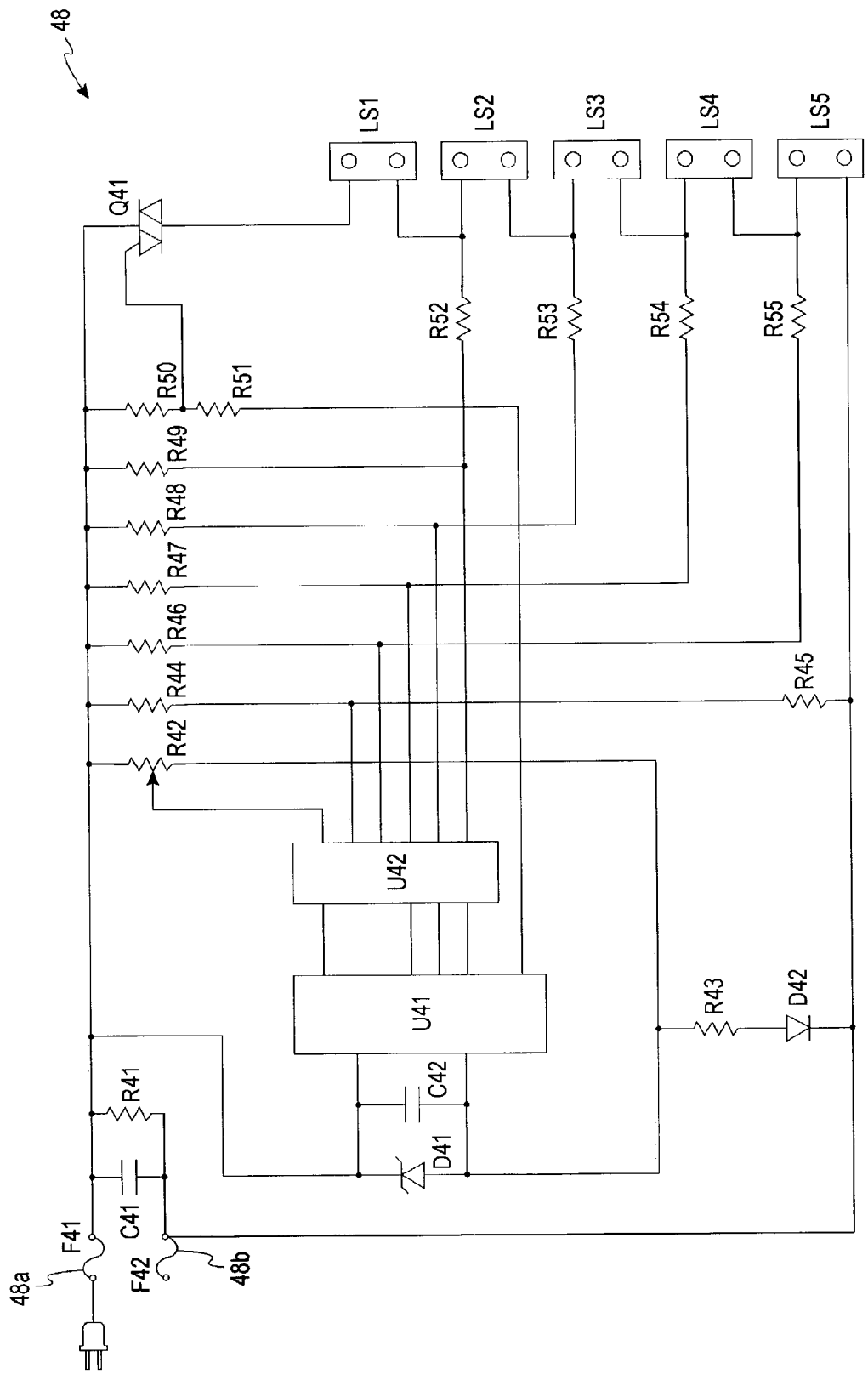
FIG. 5*c* is a schematic circuit diagram of yet another suitable power supply for use with the light string of FIGS. 1–3.

FIG. 5c is a generalized schematic for yet another power supply 48 that dissipates very little heat and drives five parallel-connected ornamental light strings LS1–LS5. The AC input at terminals 48a, 48b is supplied through fuses F41–F42 across a film capacitor C41, a small bleeder resistor R41.

The power supply of FIG. 5c uses a microprocessor to turn on a Triac device Q41 for a portion of each line half cycle. In one embodiment, an 8-bit microcontroller U41 (e.g., Microchip PIC12C671 device) and a selector device U42 (e.g., a CD4051 CMOS 8-channel analog switch device) are used to monitor and control the output voltages supplied to light strings LS1–LS5. The microcontroller U41 is powered by a zener diode D41 in parallel with a capacitor C42 connected to one side of the input power leg and connected to the other leg of the input power through a surge and current limiting circuit formed by resistor R43 and diode D42. The microcontroller U41 can also detect a bad string at one of the terminals and blink an LED adjacent to the terminal with the bad string. The output voltage control is accomplished by an output of the microcontroller U41 which pulses the gate of the Triac Q41, through a divider circuit of R50–R51, on for set intervals of time to achieve the required voltage. The microcontroller U41 samples, in round robin fashion, the voltage at each output terminal through resistor pairs R44–R45, R46–R55, R47–R54, R48–R53 and R49–R52 and compares the voltages to the voltage set by a dimming potentiometer R42. The potentiometer R42 sets the upper voltage to be applied to the output terminals for the five light strings LS1–LS5.

At power-up/reset, the microcontroller U41 pulses on the gate of the TRIAC Q41 to allow an output of 20% maximum power. Then a cycle of reading each node and comparing the maximum voltage read to the setting of the dimming potentiometer R42 starts. The microcontroller U41 continues to increase the output voltage until the voltage set by the potentiometer R42, within 5%, has been reached. The accuracy is set by the tolerance of the resistors. The voltage sampling and comparison is a continual loop while the circuit is powered. If a voltage is sampled which is over the voltage set by the potentiometer R42, or over 24 volts, then the microcontroller U41 reduces the output level until the output voltage is within 5% of the set voltage or 24 volts, whichever is lower.

The use of PWM maintains high power efficiency and low thermal waste. This is especially important in the efficiency gained in lamp dimming use, which with rheostats or frequency modulated supplies, wastes more power and increases thermal output of such supplies. A further benefit of PWM circuit efficiency is that no cooling fan is required and a sealed housing can be used, eliminating fan noise and/or a potential fire hazard from airborne particulate matter entering the cooling vents of an unsealed housing. A power supply as described herein can achieve an efficiency of 96% or greater.

The light string is preferably designed so that the load on the power supply remains fixed, thereby avoiding the need to include voltage-control circuitry in the power supply to maintain a constant voltage with variable loads. For example, the light string preferably does not include a plug or receptacle to permit multiple strings to be connected together in series, end-to-end. Multiple strings may be supplied from a single power supply by simply connecting each string directly to the power supply output via parallel outlet sockets. Extra lengths of wire may be provided between the power supply and the first light group of each string to permit different strings to be located on different portions of a tree. Because DC ripple is insignificant in decorative lighting applications, circuitry to eliminate or control such fluctuations is not necessary, thereby reducing the size and cost of the power supply.

The low-voltage output of the power supply may have a voltage level other than 24 volts, but it is preferably no greater than the 42.4 peak voltage specified in the UL standard UL1950, SELV (Safe Extra-Low Voltage). With a 30-volt supply, for example, 10-volt lights may be used in groups of three, or 6-volt lights may be used in groups of five. Other suitable supply voltages are 6 and 12 volts, although the number of lights should be reduced when these lower output voltages are used.

The power supply may produce either a DC output or low-voltage AC outputs. The frequency of a low-voltage AC output is preferably in the range from about 10 KHz to about 150 KHz to permit the use of relatively small and low-cost transformers.

The voltage across each light must be kept low to minimize the complexity and cost of the light bulb and its socket. Six-volt bulbs are currently in mass production and can be purchased at a low cost per bulb, especially in large numbers. These bulbs are small and simple to install, and the low voltage permits the use of thin wire and inexpensive sockets, as well as minimizing the current in the main conductors. In the illustrative light string of FIG. 1 with a 24-volt supply and four lights per group, the voltage drop across each light is 6 volts. Consequently, the bulbs can be the simple and inexpensive bulbs that are mass produced for conventional Christmas light strings using series-connected lights. Similarly, the simple and inexpensive sockets used in such conventional Christmas light strings can also be used. Simple crimped electrical contacts may be provided at regular intervals along the lengths of the parallel conductors 11 and 12 for connection to the end sockets in each group of four lights. The maximum current level is only about 2 amperes in a 100-light string using four 6-volt lights per group and a 24-volt supply, and thus the two conductors 11 and 12 can also be light, thin, and inexpensive.

Light strings embodying the present invention are particularly useful when used to pre-string artificial trees, such as Christmas trees. Such trees can contain well over 1000 lights and can cost several hundred dollars (US) at the retail level. When a single light and its shunt fail in a series light string, the lights in an entire section of the tree can be extinguished, causing customer dissatisfaction and often return of the tree for repair or replacement pursuant to a warranty claim. When the artificial tree is made in sections that are assembled by the consumer, only the malfunctioning section may be returned, but the cost to the warrantor is nevertheless substantial. With the light string of the present invention, however, the only lights that are extinguished when a single light fails are the lights in the same series-connected group as the failed light. Since this group includes only a few lights, typically 2 to 5 lights, the failed bulb can be easily located and replaced.

When pre-stringing artificial trees, the use of a single low-voltage power supply for multiple strings is particularly advantageous because it permits several hundred lights to be powered by a single supply. This greatly reduces the cost of the power supply per string, or per light, and permits an entire tree to be illuminated with only a few power supplies, or even a single power supply, depending on the number of lights applied to the tree.

Figure 6A:
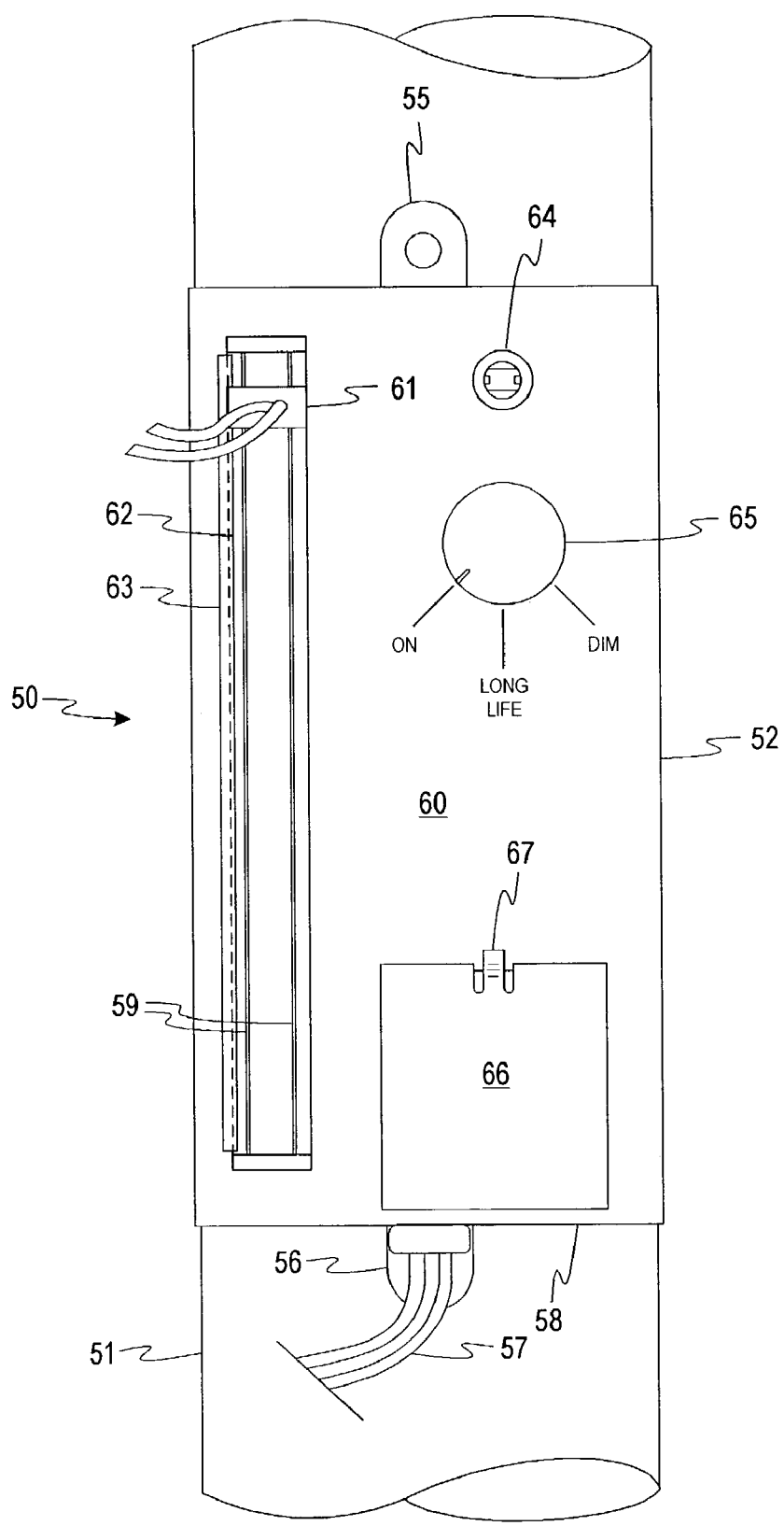
FIG. 6*a* is a front elevation of a power supply for supplying multiple light strings on a prelit artificial tree.
Figure 6B:
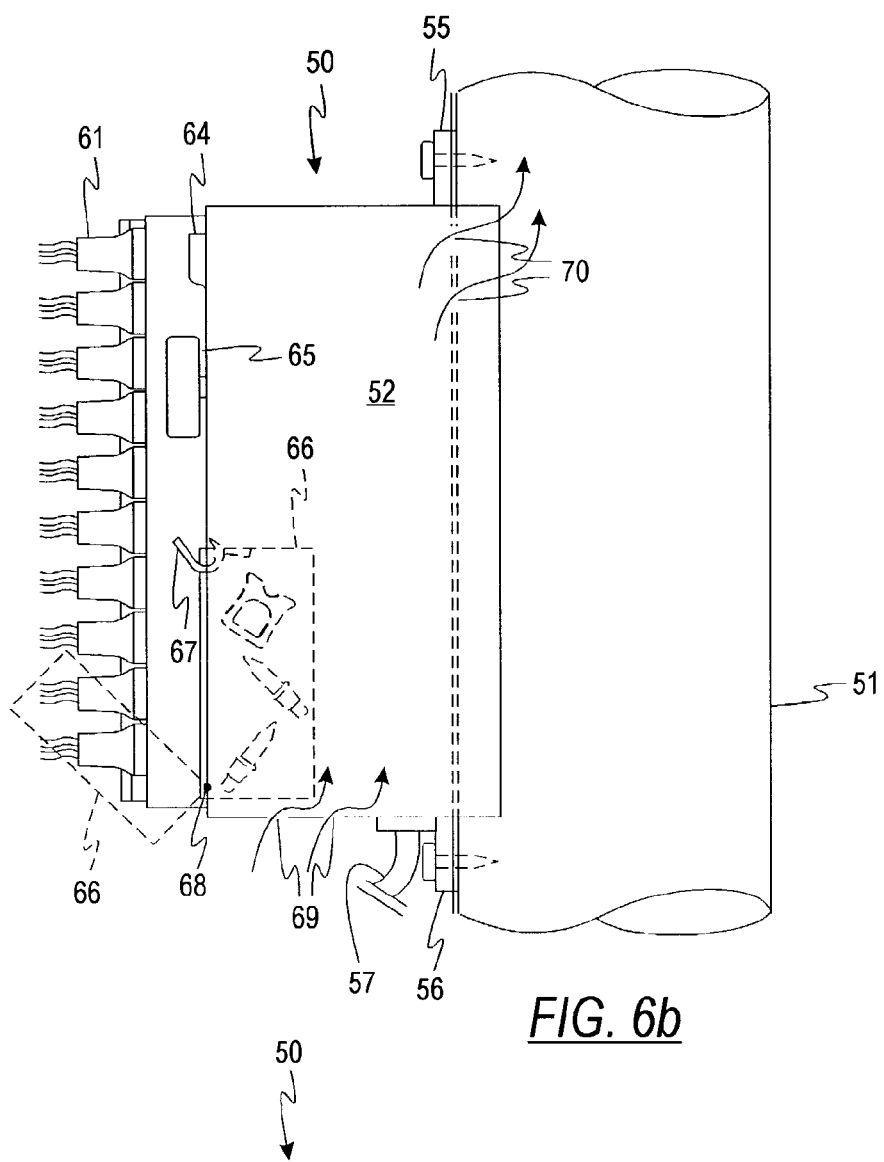
FIG. 6*b* is an end elevation of the power supply of FIG. 6*a*.
Figure 6C:
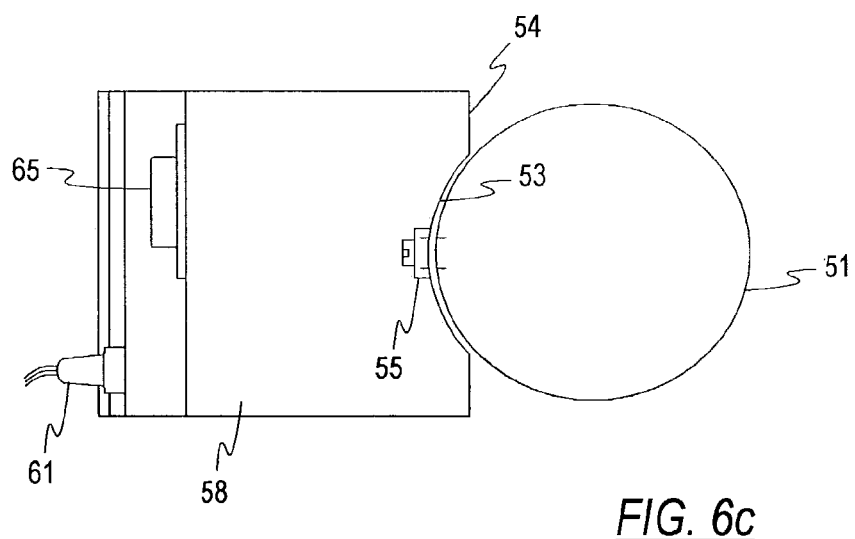
FIG. 6*c* is a top plan view of the power supply of FIG. 6*a*.

FIGS. 6a–6c illustrate a single power supply 50 for supplying power to as many as ten light strings on a prelit artificial tree having a hollow artificial trunk 51. The power supply is contained in a housing 52 having a concave recess 53 in its rear wall 54 to mate with the outer surface of the artificial trunk 51. A pair of apertured mounting tabs 55 and 56 are provided at opposite ends of the rear wall 54 to permit the power supply to be fastened to the trunk 51 with a pair of screws. The power input to the supply 50 is provided by a conventional three-conductor cord 57 that enters the housing through the bottom wall 58. The free end of the cord 57 terminates in a standard three-prong plug that fits into a conventional residential electrical outlet.

The power output of the supply 50 is accessible from a terminal strip 59 mounted in a vertically elongated slot in the front wall 60 of the housing 52. This terminal strip 59 can receive up to ten plugs 61 on the ends often different light strings, as illustrated in FIG. 6b. Thus, if each light string contains 100 lights, the power supply can accommodate a total of 1000 lights for a given tree. Each plug 61 is designed to fit the terminal strip 59 but not standard electrical outlets, to avoid accidental attachment of the low-voltage light string to a 120-volt power source. A latch 62 extends along one elongated edge of the terminal strip 59 to engage each plug 61 as it is inserted into the strip, to hold the plugs in place. When it is desired to remove one of the plugs 61, a release tab 63 is pressed to tilt the latch enough to release the plug.

The front wall of the power supply 50 also includes a bulb-testing socket 64 containing a pair of electrical contacts positioned to make contact with the exposed filament leads on a 6-volt bulb when it is inserted into the socket 64. The contacts in the socket 64 are connected to a 6-volt power source derived from the power-supply circuit within the housing 52, so that a good bulb will be illuminated when inserted into the socket 64.

If desired, dimmer, flicker, long-life and other operating modes can be provided by the addition of minor circuitry to the power supply. In the illustrative power supply 50, a selector switch 65 is provided on the front of the housing 52 to permit manual selection of such optional modes.

The front wall 60 of the housing 52 further includes an integrated storage compartment 66 for storage of spare parts such as bulbs, tools and/or fuses. This storage compartment 66 can be molded as a single unit that can be simply pressed into place between flanges extending inwardly from the edges of an aperture in the front wall 60 of the housing 52. The flange on the top edge of the aperture engages a slightly flexible latch 67 formed as an integral part of the upper front corner of the storage compartment 66. The lower front corner of the compartment and the adjacent flanges form detents 68 that function as pivot points to allow the storage compartment 66 to be pivoted in and out of the housing 52, as illustrated in FIG. 6b, exposing the open upper end of the storage compartment.

As can be seen in FIG. 6b, the bottom and rear walls 58 and 54 of the housing 52 are preferably provided with respective holes 69 and 70 that allow air to flow by convection through the housing to provide desired of the circuit elements within the housing.

Figure 7A:
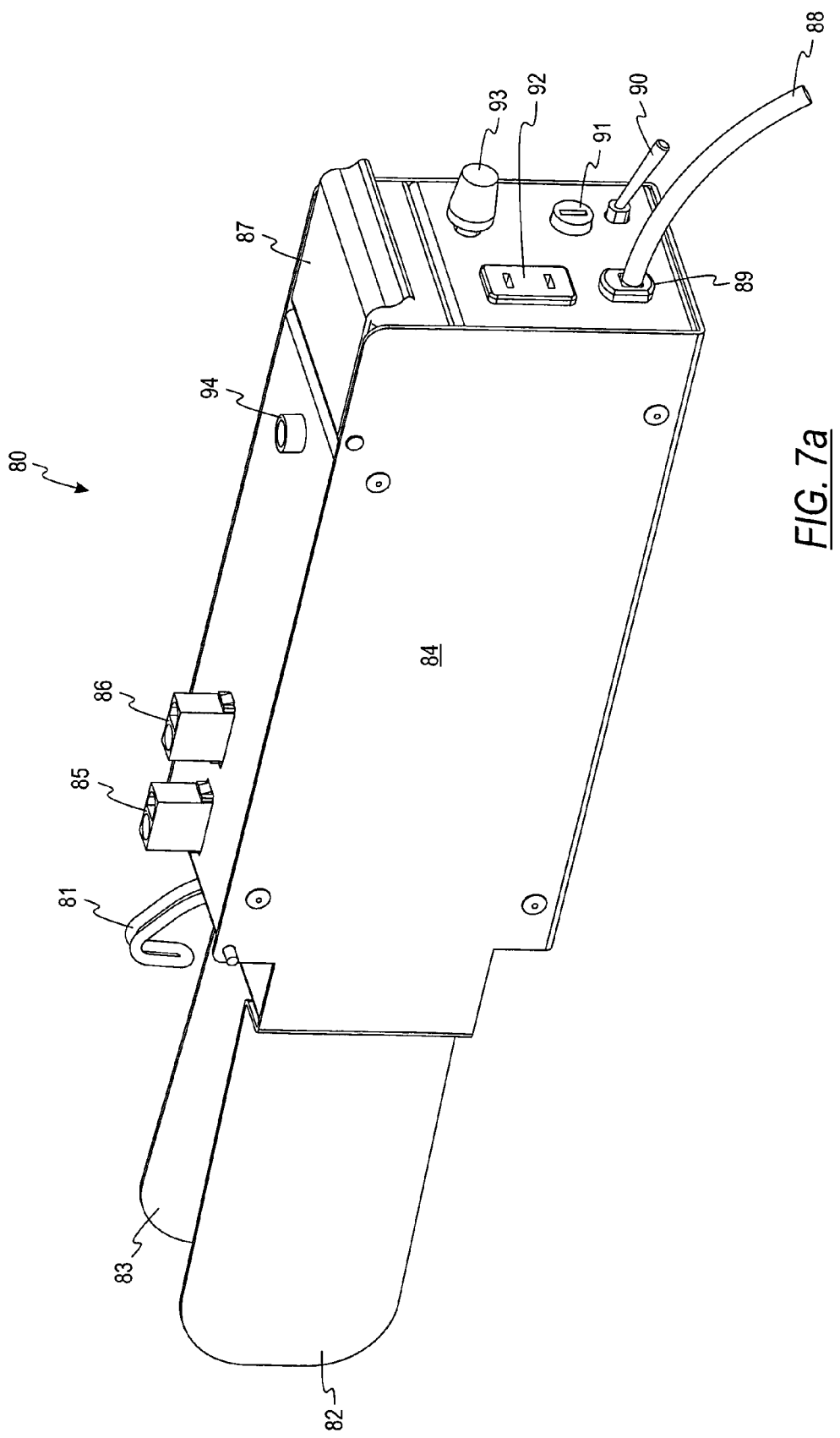
FIG. 7*a* is a perspective view of a modified power supply for supplying multiple light strings on a prelit artificial tree.
Figure 7B:
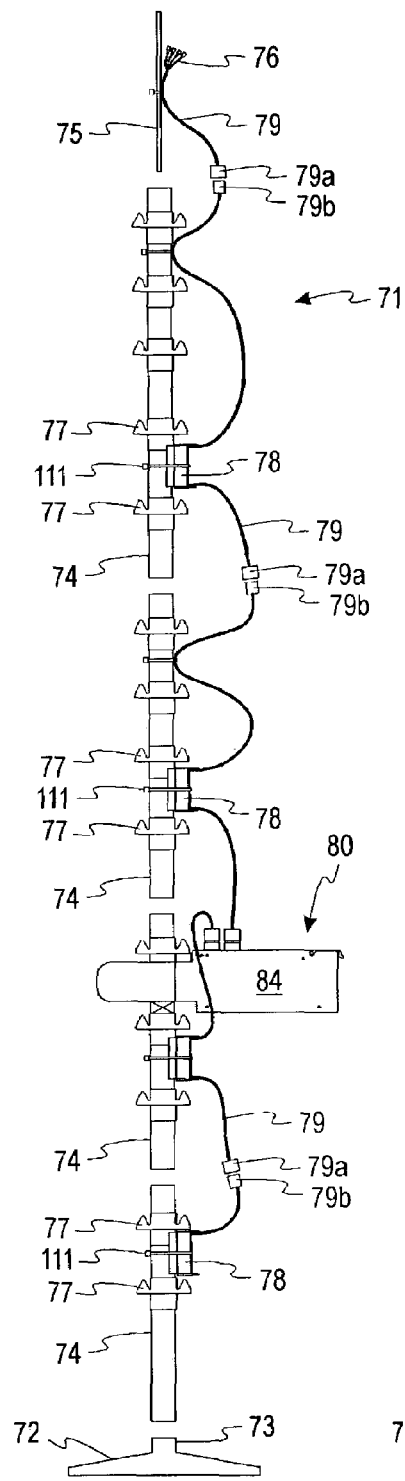
FIGS. 7*b*–7*d* are elevation views of the power supply of FIG. 7*a* attached to masts for prelit artificial trees of three different heights.
Figure 7C:
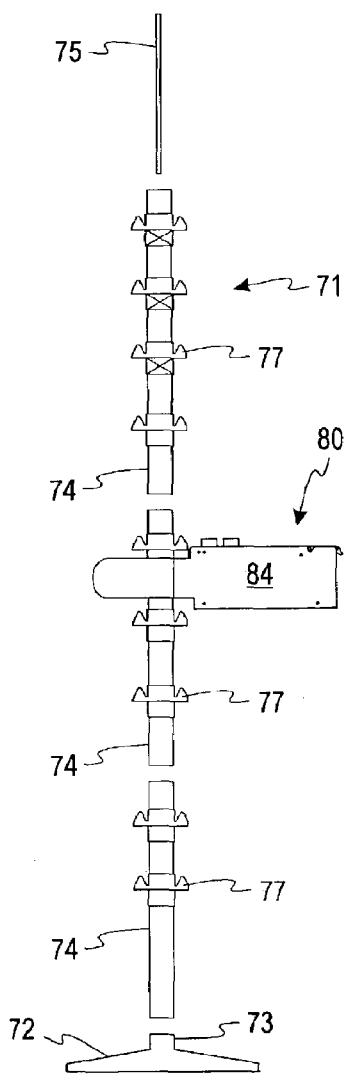
Figure 7D:
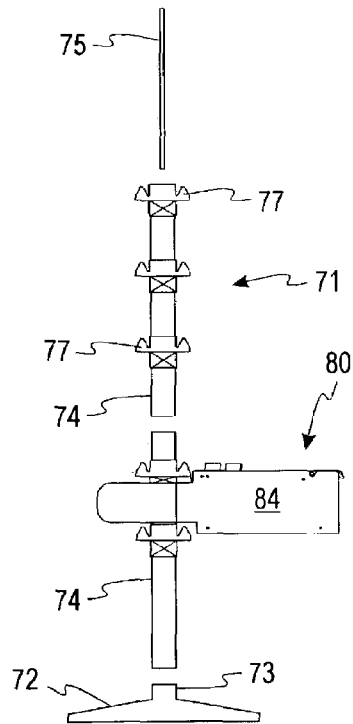

FIGS. 7b–7d illustrates a mast assembly 71 for an artificial Christmas tree. The mass assembly includes having a base 72 having a flange adapted to telescope over and hold the bottom 73 of a mast section 74. The top of each mast section 74 is adapted similarly to the base 72 to be able to telescope over and hold the bottom of another mast section 74 so that Christmas trees of varying height may be constructed. At the top section of each assembly, a crown section 75 may be adapted to hold a connector 76 and/or a conventional Christmas tree ornament. Five-, four- and three-section assemblies are shown in FIGS. 7b–7d.

Each mast section 74 carries two or more collars 77 used to attach artificial tree branches to the mast. Between one pair of the collars 77 on each mast section, a connector block 78 is mounted on the mast section to supply power to the light strings on the branches attached to that mast section. The connector block 78 will be described in more detail below in connection with FIGS. 8a–8d. The connector blocks 78 on the multiple mast sections 74 are connected in series with each other by multiple low-voltage wires 79 extending vertically along the mast, with each of the wires 79 having a male connector 79a on one end and a female connector 79b on the other end.

To supply power to the series-connected connector blocks 78, a single low-voltage power supply 80 is hung on one of the mast sections 74 by means of a hook 81 that fits over the edge of one of the collars 77. To stabilize the power supply 80 on the mast, the side walls of the housing 84 are extended to form a pair of cantilevered plates 82 and 83 that engage opposite sides of the mast, while the inner end wall of the housing 84 also bears against the mast. The power supply 80 (see FIG. 7a) is placed on any convenient mast section 74 on which the attached branches will have a length sufficient to conceal the power supply. Low-voltage power is available from a pair of outlets 85 and 86 on the top of the power supply housing 84. These outlets 85, 86 receive two of the wires 79, one extending downwardly along the mast, and the other extending upwardly along the mast.

As can be seen in FIG. 7a, the outer end portion of the top wall of the housing 84 forms a hinged lid 87 which covers a compartment for storage of spare parts such as bulbs, tools and/or fuses.

Figure 8A:
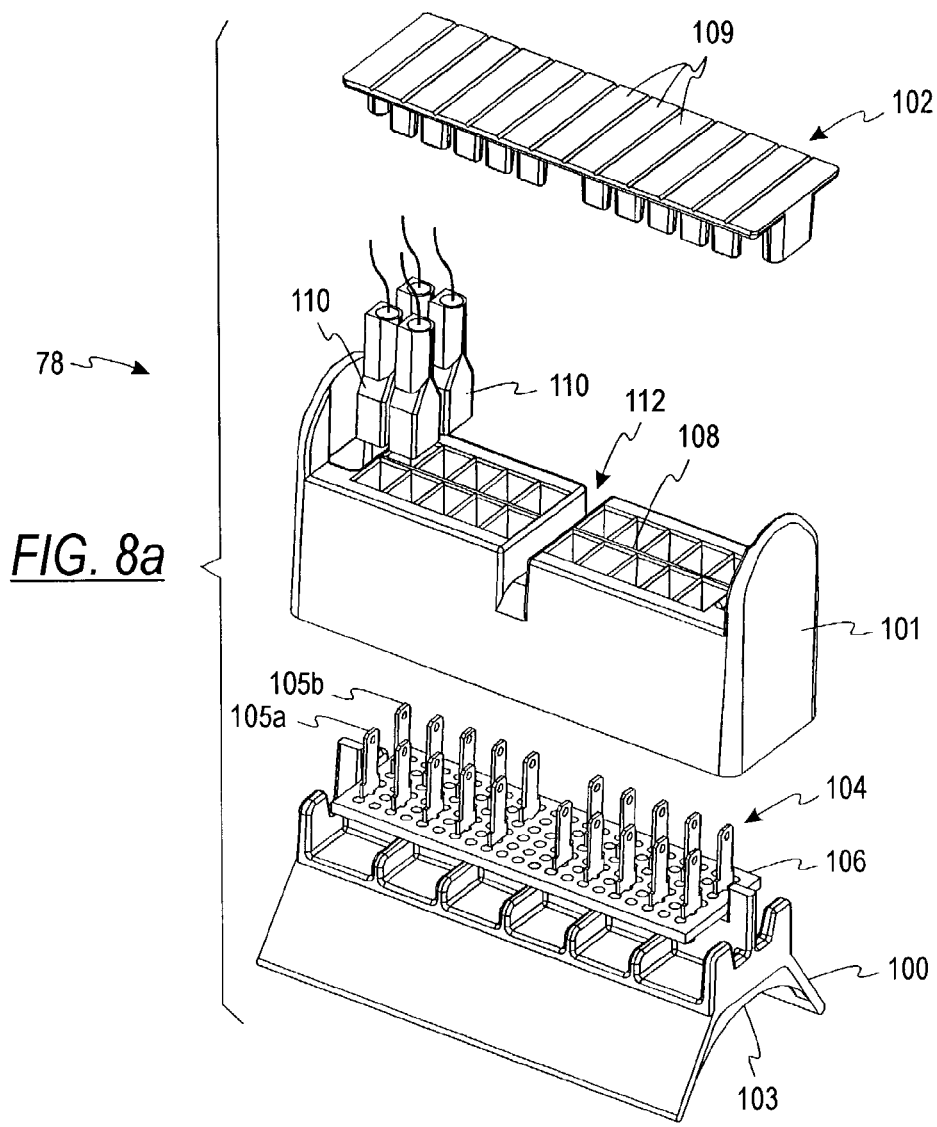
FIG. 8*a* is an exploded perspective view of one of the connector blocks used in the mast assembly of FIG. 7*b*.
Figure 8B:
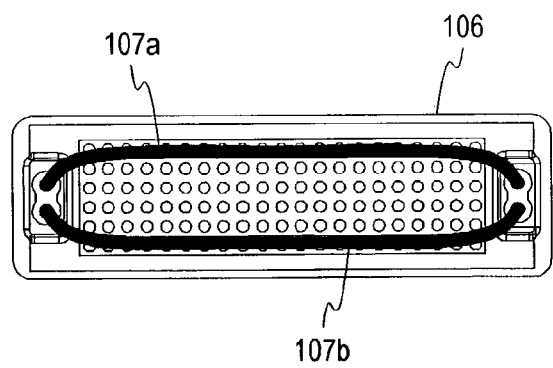
FIG. 8*b* is a bottom plan view of the connector pin plate in the connector block of FIG. 8*a*.
Figure 8D:
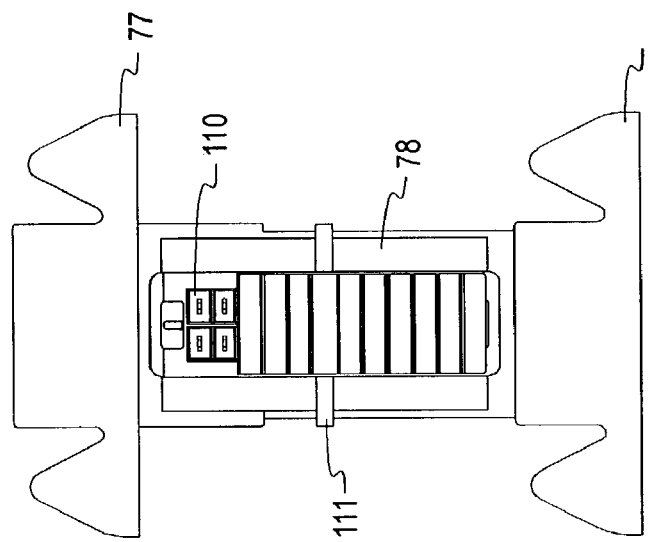
FIG. 8*d* is an enlarged front elevation of one of the connector blocks mounted on the mast assembly of FIG. 7*b*.
Figure 8C:
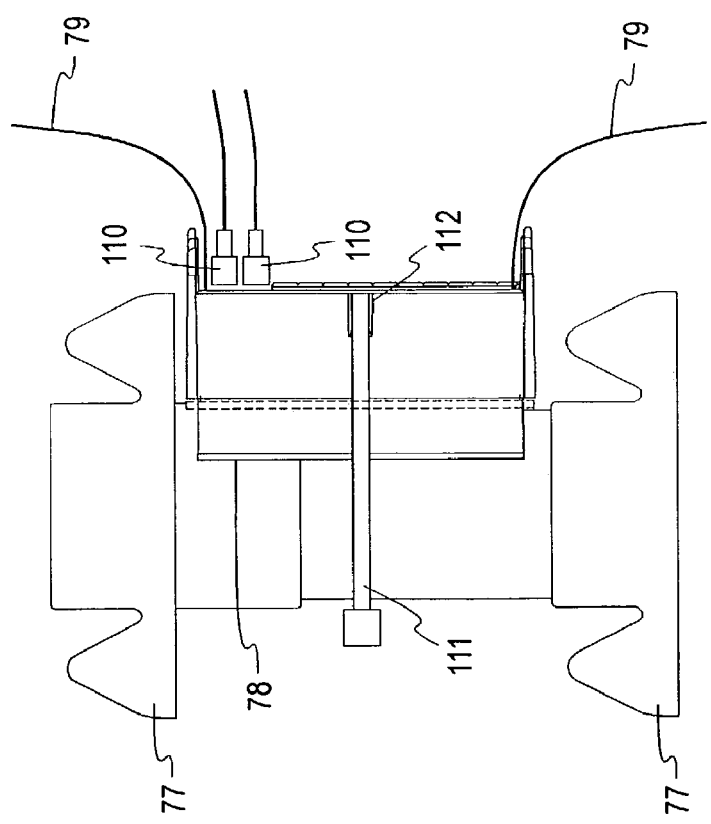
FIG. 8*c* is an enlarged side elevation of one of the connector blocks mounted on the mast assembly of FIG. 7*b*.

Electric power is supplied to the powersupply circuit within the housing 84 by a conventional three-conductor cord 88 that enters the outer end of the housing 84 through a strain relief bushing 89 and is internally connected to an on/off, SPDT switch 90, a fuse 91, a polarized plug 92 and a dimmer switch 93. The plug 92 is electrically connected as an AC extension, controlled by the switch 90 and protected by the fuse 91. The free end of the cord 88 terminates in a standard three-prong plug (not shown) that fits into a conventional residential AC electrical outlet. The top wall of the housing 84 also contains a bulb test socket 94 containing a pair of electrical contacts positioned to make contact with the exposed filament leads on a 6 volt bulb when it is inserted into the socket 94. The contacts in the socket 94 are connected to a 6-volt power source derived from the power-supply circuit within the housing 84, so that a good bulb will be illuminated when inserted into the socket 94. One of the connector blocks 78 is illustrated in FIGS. 8a and 8b, and is shown mounted on a mast section in FIGS. 8c and 8d. The block 78 includes a base 100, a pin cover 101 and a safety cover 102. The base 100 has a concave external bottomsurface 103 to conform to the outer surface of the mast on which it is mounted, and holds a pin assembly 104 that has two rows of pins 105a and 105b extending upwardly from an insulating plate 106. On the underside of the plate 106, all the pins in each row are interconnected by a common electrical conductor 107a or 107b (see FIG. 8b). The pin cover 101 fits over the pin assembly 104 and includes multiple, intersecting internal walls 108 that form a sheath to isolate each pin. The safety cover 102, which snaps into place on the pin cover 101, has scoring 109 along the outer top side as illustrated in FIG. 8a. The safety cover may be broken off along the scoring to fill unused connector pairs of the connector block 78.

In use, the pins 105a, 105b form male connectors that mate with female connectors 110 on the ends of the light strings attached to the tree branches that extend radially from the mast.

To attach the connector block 78 to the mast, a cable tie 111 is passed through a groove 112 in the pin cover 101 and around the mast, and pulled tight to hold the connector block firmly against the mast.

Figure 9:
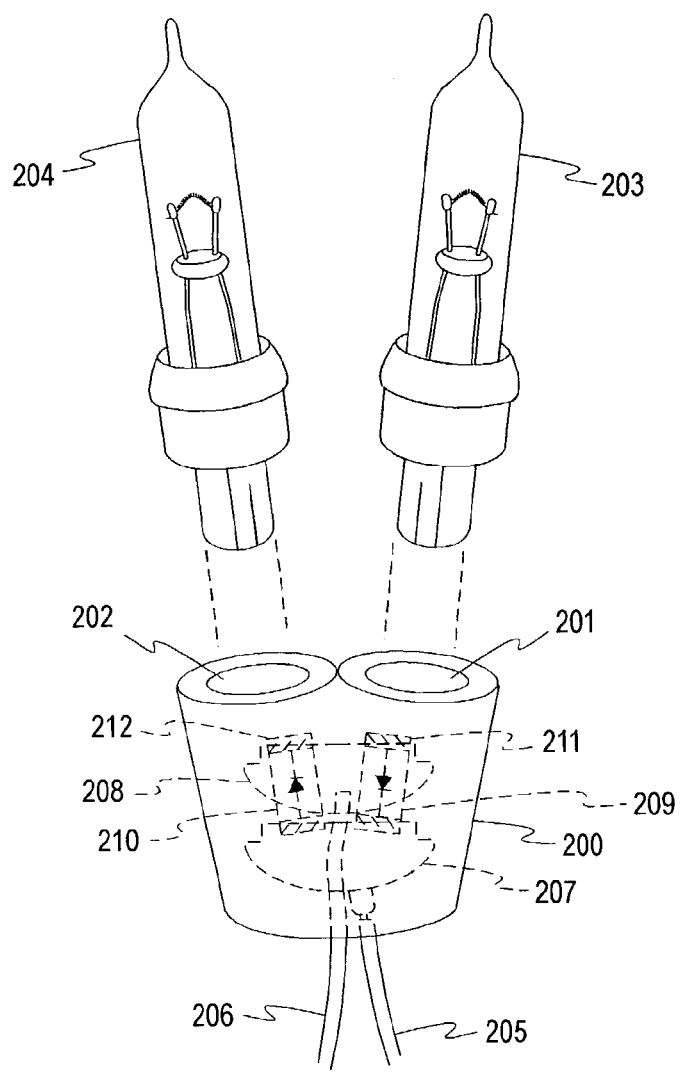
FIG. 9 is an exploded perspective view of a modified bulb and socket for use in the light string of FIGS. 1–3.

FIG. 9 illustrates a modified bulb-socket construction for use with a low-voltage DC power supply. A DC power supply may be the same electronic-transformer power supply described above with the addition of a full-wave rectifier at the output to convert the low-voltage, high-frequency voltage to a low-voltage, DC voltage. The plug on the light string to be connected to the DC power supply is reversible so that the plug may be inserted into the socket of the power supply in either of two orientations, which will cause the DC current to flow through the light string in either of two directions. As will be described in more detail below, the direction of the current flow determines which of two bulbs in each of the multiple sockets along the length of the string are illuminated. This permits different decorative effects to be achieved with the same string by simply reversing the orientation of the string plug relative to the power-supply socket. For example, the bulbs illuminated by current flow in one direction may be clear bulbs, while the bulbs illuminated by current flow in the opposite direction may be colored and/or flashing bulbs.

As can be seen in FIG. 9, each socket 200 forms receptacles 201 and 202 for two different bulbs 203 and 204, respectively. For example, bulb 203 may be clear and bulb 204 colored. Power is delivered to both receptacles 201 and 202 by the same pair of wires 205 and 206, but the connector tabs 207 and 208 attached to the wires have increased widths to permit electrical connection to the exposed filament leads on the bases of both bulbs. The rear connector tab 208 makes direct contact with one of the filament leads on the base of each bulb. The front connector tab 207 carries a pair of inexpensive, oppositely poled, surface-mount diodes 209 and 210 having metallized contact surfaces 211 and 212 at their upper ends. Each of the metallized contact surfaces 211 and 212 makes contact with a filament lead on only one of the bulb bases, so that each diode 209 and 210 is connected to only one bulb. Because a diode conducts current in only one direction, and the two diodes are poled in opposite directions, the DC current supplied to the socket 200 will flow through only one of the two bulbs 203 or 204, depending upon the direction of the current flow, which in turn depends upon the orientation of the string plug relative to the power-supply socket.

As shown in FIG. 9, the two bulbs 203 and 204 preferably diverge from each other to reduce reflections from the non-illuminated bulb in each pair. If desired, a non-reflective barrier may be provided between the two bulbs.

A modified construction is to provide only a single pair of diodes for each of the parallel groups of lights. The diodes are provided at one end of each parallel group, with two separate wires connecting each diode to one of the two bulbs in each socket in that group.

Another modified construction uses only a single bulb in each socket, with each bulb having two filaments and two diodes integrated into the base of the bulb for controlling which filament receives power. The two filaments are spaced from each other along the axis of the bulb, and one end portion of the bulb is colored so that illumination of the filament within that portion of the bulb produces a colored light, while illumination of the other filament produces a clear light. Alternatively, the opposite end portions of the bulb can both be colored, but of two different colors.

Figure 9A:
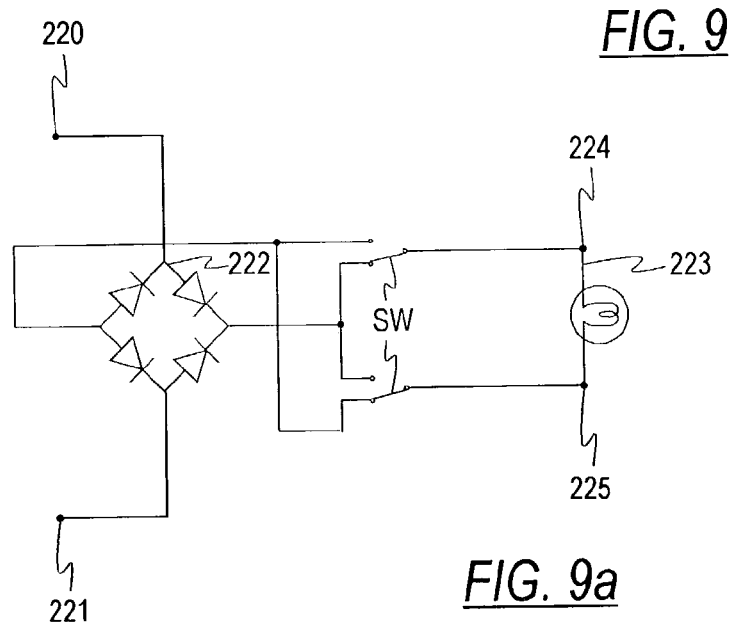
FIG. 9*a* is a schematic circuit diagram of a reversible DC power supply for use with the modified bulb and socket shown in FIG. 9.

FIG. 9a is a diagram of a circuit for reversing the polarity of a DC power supply. The standard AC power source is connected across a pair of input terminals 220 and 221 and full-wave rectified by a diode bridge 222 as described above. The rectified output of the bridge 222 is supplied to the light string 223 connected to output terminals 224 and 225. Between the bridge 222 and the terminals 224, 225, a dual pole switch SW can change the direction of current flow so that the polarity of the terminals 224 and 225 is reversed.

Figures 10, 11:
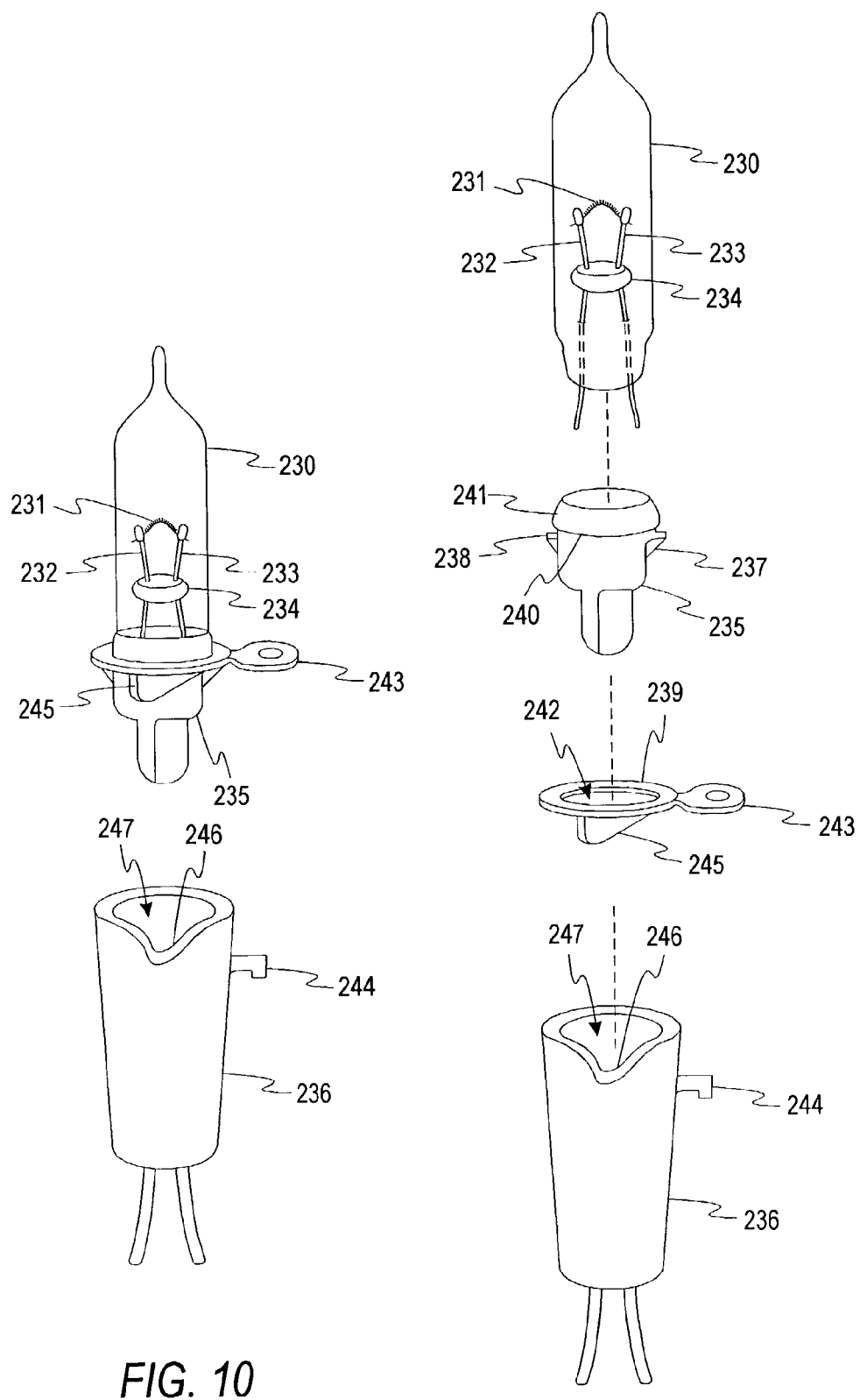
FIG. 10 is an exploded perspective view of another modified bulb and socket for use in the light string of FIGS. 1–3.
FIG. 11 is an exploded view of the bulb and socket shown in FIG. 10.

FIGS. 10 and 11 illustrate a modified bulb base and socket construction that facilitates the replacement of a failed bulb. The bulb 230 in FIGS. 10 and 11 has the same construction described above, including a filament 231 and a pair of filament leads 232 and 233 held in place by a glass bead 234. The leads 232 and 233 extend downwardly through a molded plastic bulb base 235 that fits into a complementary socket 236. In this modified embodiment, the bulb base 235 includes a pair of diametrically opposed lugs 237 and 238 that support a bulb-removal ring 239 between the top surfaces of the lugs and the underside 240 of the flange 241 of the base 235. The central opening 242 of the ring 239 is dimensioned to have a diameter just slightly smaller than that of the flange 241 so that the ring can be forced upwardly over the lugs 237, 238 until the ring 239 snaps over the top surfaces of the lugs, adjacent the underside of the flange 241. The ring 239 is then captured on the base 235, but can still rotate relative to the base.

To hold the bulb base 235 in the socket 236, the ring 239 forms a hinged, apertured tab 243 that can be bent downwardly to fit over a latching element 244 formed on the outer surface of the socket 236. When the bulb fails, the tab 243 is pulled downwardly and away from the socket 236 to release it from the socket 236, and then the tab 243 is used to rotate the ring 239 to assist in removing the bulb and its base 235 from the socket 236. As the ring 239 is rotated, a depending ramp 245 molded as an integral part of the ring engages a ramp 246 formed by a complementary notch 247 in the upper end of the socket 236. When the bulb base 235 and the socket are initially assembled, the ramp 245 on the ring 239 nests in the complementary notch 247. But when the ring 239 is rotated relative to the socket 236, the engagement of the two ramps 245 and 246 forces the two parts away from each other, thereby lifting the bulb base 235 out of the socket 236.

It is common to purchase Christmas lights a few strings at a time, and new packages come with spare bulbs and fuses. However, as the light strings are used, the spare parts tend to become lost, and when they are needed they cannot be found, or it becomes difficult to determine which parts go with which string. Bulbs are made with a plethora of different bases, bulb voltages, etc. and replacing a burned-out bulb with a bulb of the correct voltage, correct base type, and correct amperage fuse, not only assures optimum performance but also can be a safety factor. Some light strings are so inexpensive that the entire string can simply be replaced when a bulb fails, but such re-purchases are further inconveniences. Failing to replace burned-out bulbs increases the voltage to the other bulbs, which shortens the life of the remaining bulbs and accelerates the problem.

Figure 12:
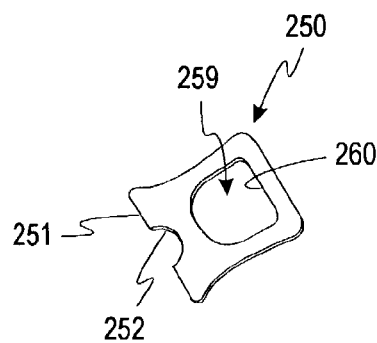
FIG. 12 is a perspective view of a tool for removing a failed bulb to be replaced.
Figure 13:
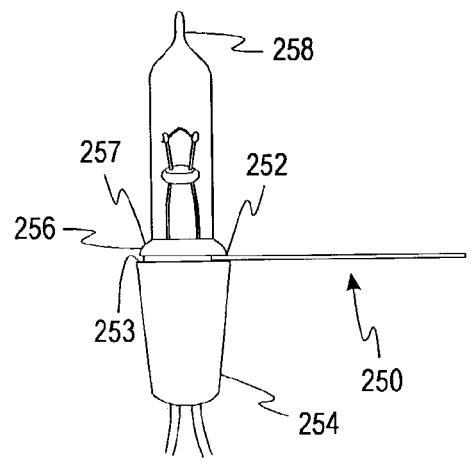
FIG. 13 is a side elevation of the tool of FIG. 12 being used to loosen a bulb from its socket.
Figure 14:
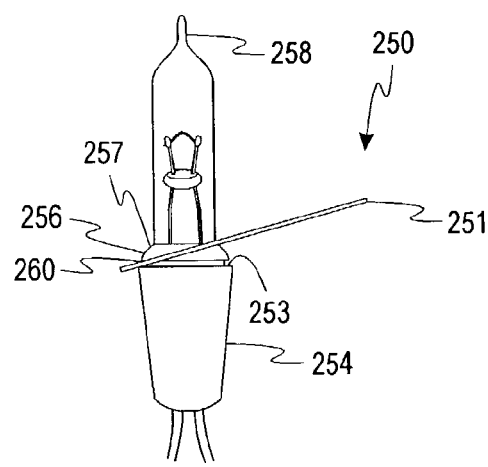
FIG. 14 is a side elevation of the tool of FIG. 12 being used to pry a bulb out of its socket.

FIGS. 12–14 illustrate a separate bulb-removal tool 250 that can be packaged with the other spare parts for a light string. The bases and sockets of such bulbs are typically made to fit tightly together to ensure that the bulbs remain in their sockets and maintain the electrical connections that are made by a tight frictional fit within those sockets. As a result, when a bulb fails, it is often difficult to remove the burned-out bulb for replacement. The tool 250 has an elongated tapered edge 251 that forms a cutout 252 that can be pressed between the top surface 253 of a bulb socket 254 and the lower surface of a flange 256 on a bulb base 257. The tool can be tilted up and down, and pivoted back and forth horizontally, while being pressed between the flange 256 and the socket surface 253, to initially loosen the bulb base 257 in its socket 254 (see FIG. 13). The tool 250 can also be placed over the bulb 258, with the bulb extending upwardly through an opening 259 in the tool, and with the inner edge 260 of the opening 259 resting on the top surface 253 of the socket 254, as illustrated in FIG. 14. With the tool 250 in this position, the tool is pulled upwardly to pry the bulb base 257 out of the socket 254. The tool 250 may be made of metal or a rigid plastic.

What is claimed is:

1. A string of decorative lights comprising
a power supply having an input adapted for connection to a standard residential electrical power outlet, said power supply including circuitry for converting the standard residential voltage to a low-voltage and higher frequency output,
a pair of conductors connected to the output of said power supply for supplying said low-voltage output to multiple decorative lights, and
a plurality of lights divided into a plurality of groups of at least two lights, each of said plurality of groups of at least two lights connected to said pair of conductors along the lengths thereof, each of said plurality of groups of said at least two lights, being connected in parallel across said conductors.

2. A string of decorative lights as set forth in claim 1 wherein each of said lights is about a half-watt bulb.

3. A string of decorative lights as set forth in claim 1 wherein each of said lights requires a voltage or about 6 volts or less.

4. A string of decorative lights as set forth in claim 1 wherein said lights are connected in parallel across said conductors in parallel groups of two to five lights per group, the lights within each group being connected in series.

5. A string of decorative lights as set forth in claim 1 wherein said standard residential voltage is 120 volts and approximately 100 6-volt lights are connected to said conductors.

6. A string of decorative lights as set forth in claim 1 wherein said low-voltage output is less than about 30 volts.

7. A string of decorative lights as set forth in claim 1 wherein said power supply comprises an electronic transformer.

8. A string of decorative lights as set forth in claim 1 wherein said power supply comprises a switching power supply.

9. A string of decorative lights as set forth in claim 1 wherein said higher frequency is in the range from about 10 KHz to about 150 KHz.

10. A string of decorative lights as set forth in claim 1 wherein said conductors are connected to a fixed number of said lights so as to provide a fixed load on said power supply.

11. A string of decorative lights as set forth in claim 1 wherein each of said lights includes means for shunting the light in response to a failure of the light.

12. A string of decorative lights as set forth in claim 1 wherein said higher frequency is pulse width modulated.

13. A string of decorative lights as set forth in claim 1 wherein said power supply includes a dimmer control.

14. A string of decorative lights as set forth in claim 1 wherein said plurality of lights are incandescent lights and said power supply includes a soft-start.

15. A string of decorative lights as set forth in claim 1 which includes a converter for producing a DC output from said high-frequency output.

16. A string of decorative lights as set forth in claim 15 which includes a switch for reversing the current flow in said light string from said DC output to change the decorative effect of said lights.

17. A decorative lighting system, said system comprising
a power supply having an input adapted for connection to a standard residential electrical power outlet, said power supply including circuitry for converting the standard residential voltage to a low-voltage and higher frequency output,
a plurality of pairs of conductors connected to the output of said power supply for supplying said low-voltage output to multiple sets of decorative lights, and
a plurality of lights connected to each pair of said conductors along the lengths thereof, said plurality of lights divided into a plurality of groups of at least two lights, each of said groups of said lights being connected in parallel across each of said pairs of conductors.

18. A decorative lighting system as set forth in claim 17 wherein each of said lights is about a half-watt bulb.

19. A decorative lighting system as set forth in claim 17 wherein each of said lights requires a voltage or about 6 volts or less.

20. A decorative lighting system as set forth in claim 17 wherein each of said pairs of conductors has multiple groups of said lights connected in parallel across the conductor pair, each of said parallel groups including two to five lights connected in series within the group.

21. A decorative lighting system as set forth in claim 17 wherein said standard residential voltage is 120 volts and approximately 100 6-volt lights are connected to each of said pairs of conductors.

22. A decorative lighting system as set forth in claim 17 wherein said low-voltage output is less than about 30 volts.

23. A decorative lighting system as set forth in claim 17 wherein said power supply comprises an electronic transformer.

24. A decorative lighting system as set forth in claim 17 wherein said power supply comprises a switching power supply.

25. A decorative lighting system as set forth in claim 17 wherein said higher frequency is in the range from about 10 KHz to about 150 KHz.

26. A decorative lighting system as set forth in claim 17 wherein each of said pairs of conductors is connected to a fixed number of said lights so as to provide a fixed load on said power supply.

27. A decorative lighting system as set forth in claim 17 wherein each of said lights includes means for shunting the light in response to a failure of the light.

28. A decorative lighting system as set forth in claim 17 wherein said higher frequency is pulse width modulated.

29. A decorative lighting system as set forth in claim 17 wherein said power supply output is variable.

30. A decorative lighting system as set forth in claim 17 wherein said plurality of lights are incandescent lights and said power supply includes a soft-start.

31. A decorative lighting system as set forth in claim 17 which includes a converter for producing a DC output from said high-frequency output.

32. A string of decorative lights as set forth in claim 31 which includes a switch for reversing the current flow in said light string from said DC output to change the decorative effect of said lights.

33. A method of powering a string of decorative lights, said method comprising
converting a standard residential electrical voltage to a low-voltage and a higher frequency, and
supplying said low-voltage to a pair of parallel conductors having multiple decorative lights connected to said conductors along the lengths thereof, the plurality of lights divided into groups of at least two lights, each of said groups of said lights being connected in parallel across said conductors.

34. A method of powering a string of decorative lights as set forth in claim 33 wherein each of said lights is about a half-watt bulb.

35. A method of powering a string of decorative lights as set forth in claim 33 wherein each of said lights requires a voltage or about 6 volts or less.

36. A method of powering a string of decorative lights as set forth in claim 33 wherein said lights are connected in parallel across said conductors in parallel groups of two to five lights per group.

37. A method of powering a string of decorative lights as set forth in claim 33 wherein said standard residential voltage is 120 volts and approximately 100 6-volt lights are connected to said conductors.

38. A method of powering a string of decorative lights as set forth in claim 33 wherein said low-voltage output is less than about 30 volts.

39. A method of powering a string of decorative lights as set forth in claim 33 wherein an electronic transformer is used in the conversion of said standard residential electrical voltage to a low voltage.

40. A method of powering a string of decorative lights as set forth in claim 33 wherein a switching power supply is used in the conversion of said standard residential electrical voltage to a low voltage.

41. A method of powering a string of decorative lights as set forth in claim 33 wherein said higher frequency is in the range from about 10 KHz to about 150 KHz.

42. A method of powering a string of decorative lights as set forth in claim 33 wherein a fixed load is maintained on said conductors by limiting the number of lights connected to said conductors to a fixed number.

43. A method of powering a string of decorative lights as set forth in claim 33 which includes the step of shunting each of said lights in response to a failure of that light.

44. A method of powering a string of decorative lights as set forth in claim 33 wherein said higher frequency is pulse width modulated.

45. A method of powering a string of decorative lights as set forth in claim 33 wherein said conversion of standard residential electrical voltage to a low-voltage includes varying the output voltage.

46. A method of powering a string of decorative lights as set forth in claim 33 wherein said conversion of standard residential electrical voltage to a low-voltage includes soft-starting.

47. A method of powering a string of decorative lights as set forth in claim 33 which includes converting said high-frequency output to DC.

48. A method of powering a string of decorative lights as set forth in claim 47 which includes a switch for reversing the current flow in said light string from said DC output to change the decorative effect of said lights.

* * * * *